(12) United States Patent
Larkin et al.

(10) Patent No.: US 11,243,861 B2
(45) Date of Patent: Feb. 8, 2022

(54) SYSTEMS, METHODS, AND COMPUTER-READABLE MEDIA FOR ANALYZING INTERCEPTED TELEMETRY EVENTS

(71) Applicant: DeepFactor, Inc., San Jose, CA (US)

(72) Inventors: Michael Kevin Larkin, San Jose, CA (US); Kiran Kamity, San Jose, CA (US)

(73) Assignee: DEEPFACTOR, INC., San Jose, CA (US)

( * ) Notice: Subject to any disclaimer, the term of this patent is extended or adjusted under 35 U.S.C. 154(b) by 7 days.

(21) Appl. No.: 16/938,869

(22) Filed: Jul. 24, 2020

(65) Prior Publication Data
US 2021/0026749 A1    Jan. 28, 2021

Related U.S. Application Data

(60) Provisional application No. 62/878,490, filed on Jul. 25, 2019, provisional application No. 62/878,502, filed on Jul. 25, 2019.

(51) Int. Cl.
| | | |
|---|---|---|
| *G06F 11/30* | (2006.01) | |
| *G06F 11/32* | (2006.01) | |
| *G06N 20/00* | (2019.01) | |
| *G06F 9/54*  | (2006.01) | |

(52) U.S. Cl.
CPC ......... *G06F 11/3072* (2013.01); *G06F 9/542* (2013.01); *G06F 11/302* (2013.01); *G06F 11/3089* (2013.01); *G06F 11/324* (2013.01); *G06N 20/00* (2019.01)

(58) Field of Classification Search
None
See application file for complete search history.

(56) References Cited

U.S. PATENT DOCUMENTS

| | | |
|---|---|---|
| 2016/0224461 A1 | 8/2016 | Araya |
| 2017/0046518 A1 | 2/2017 | Chen et al. |
| 2017/0270296 A1 | 9/2017 | Kraemer |
| 2017/0272462 A1 | 9/2017 | Kraemer et al. |
| 2018/0032423 A1 | 2/2018 | Bull et al. |
| 2020/0005093 A1* | 1/2020 | Vichare ............... G06K 9/6272 |

\* cited by examiner

*Primary Examiner* — Qing Chen
(74) *Attorney, Agent, or Firm* — Van Court & Aldridge LLP

(57) ABSTRACT

Systems, methods, and computer-readable media for intercepting telemetry events obtained during operation of an application and analyzing the telemetry events are provided. The telemetry events are intercepted at the library level by interposing on application calls to a native library. The telemetry events are collected and transmitted to a platform that analyzes the collected events and presents information based on the analysis.

24 Claims, 23 Drawing Sheets

FIG. 11

DEEPFACTOR

TEST APPLICATION > BASH COMPONENT

SHOWING METRICS FOR Entire Duration ▽ AND Latest Build ▽

Applications | Alert Policies | Admin Settings

- Summary
- Alerts
- Alert Policy
- Builds
- Nodes
- Instances
- Web Services
- Network
- Dependencies
- <> Runtime ▽
- Filesystem
- Live Stream ▽

1120
| | |
|---|---|
| Outgoing Connections | 0 |
| Incoming Connections | 0 |
| Rate of Incoming Connections | 0 |
| Rate of Outgoing Connections | 0 |

1130
| | |
|---|---|
| Files Opened | 74 |
| Average Read Size | 7.53 KB |
| Average Write Size | 59.23 Bytes |

1140
| | |
|---|---|
| Avg Memory Consumption | 503.49 MB |
| Peak Memory Consumption | 568.38 MB |

1150
| | |
|---|---|
| Web Services | 0 |
| URIs | 0 |
| # OWASP ZAP Scans | 0 |

1170
11 Instances   1 Node   4 Active Builds

1180
6 Alerts
P1   0
P2   1
P3   2

1160
| Instances | |
|---|---|
| Instance | Started at |
| v_9 | Jun 02, 2020 10:25:12 AM |
| v_9 | Jun 01, 2020 11:06:25 PM |
| v_9 | Jun 01, 2020 11:01:36 PM |
| v_9 | May 28, 2020 7:25:40 PM |

(View All)

Alerts   1185

| | Title |
|---|---|
| P2 | Use of ioctl |
| P3 | Deterministic random number generation API used |
| P3 | Unsafe string API used |
| P4 | Large memory allocation requested without size hint |
| P4 | Program forked (creates a child process) without clearing sensitive memory regions |
| P5 | Use of setpgid/setpgrp |

(View All)

● bash     x | +

← → ○ △ Not secure | https://portal/apps/ea0a-454e-529d-4a91-a96b-da25f614e96d/components/...

Ⓟ DEEPFACTOR    Applications   Alert Policies   Admin Settings

TEST   > BASH
APPLICATION    COMPONENT     SHOWING METRICS FOR   Last 30 Days ▽ AND   Latest Build ▽

- Summary
- Alerts
- Alert Policy
- Builds
- Nodes
- Instances
- Web Services
- Network
- Dependencies
- <-> Runtime ›
- Filesystem
- Live Stream ›

File Accessed
- dev
  - null
  - tty
  - urandom
- etc
  - bashrc
  - group
  - hosts
  - inputsc
  - password
- pkj
- popt
- profile.d
- rpm
- home
- marking

Files

| Name | Path | Total | Last Accessed Date |
|---|---|---|---|
| macros.dwz | /etc/rpm/macros.dwz | 3 | |
| javadoc.attr | /usr/lib/rpm/fileattrs/javadoc.attr | 1 | |
| macros.gnat-srpm | /etc/rpm/macros.gnat-srpm | 3 | |
| eif.attr | /usr/lib/rpm/fileattr/eif.attr | 3 | |
| 256term.sh | /etc/profile.d/256term.sh | 3 | |
| macros.systemd | /usr/lib/rpm/macros.d/macros.systemd | 3 | |

| Builds | | | |
|---|---|---|---|
| Build id | Released on | # Instances | Alerts |
| Manual Build | May 19, 2020, 12:50:01 PM | 139 | OP1 OP2 OP3 |
| Manual Build | May 19, 2020, 12:50:21 PM | 42 | OP1 OP2 OP3 |
| Manual Build | May 21, 2020, 7:35:36 PM | 0 | OP1 OP2 OP3 |
| Manual Build | May 21, 2020, 7:39:18 PM | 0 | OP1 OP2 OP3 |
| Manual Build | May 21, 2020, 7:39:20 PM | | |

FIG. 14

TEST APPLICATION > BASH COMPONENT

SHOWING METRICS FOR Last 30 Days ▼ AND Latest Build ▼

- Summary
- Alerts
- Alert Policy
- Builds
- Nodes
- Instances
- Web Services
- Network
- Dependencies
- Runtime ›
- Filesystem
- Live Stream ›

Node

| Node | |
|---|---|
| ✓ Unexpected Use of Resources | No Alerts |
| ✓ Slow Infrastructure | No Alerts |
| ✓ Insecure OS | No Alerts |
| ✓ Improper Host Configuration | No Alerts |
| ✓ Insecure Environment | No Alerts |
| ✓ End of life/service operating system | No Alerts |

Information

| | |
|---|---|
| OS Version | 7 |
| OS distribution | CentOS Linux 7 (Core) |
| Container | None |
| Cloud Perform | None |
| Hypervisor Info | Hyper-V (v10.0 (build 18362. service pack 0, service branch/num 0/836)); Hyper-V (v10.0 (build18362, service pack0, service branch/num 0/900)) |
| Number of Hosts | 1 |

Nodes

| Hostname | OS | Cloud Platform | # CPUs | CPU Type | Containerized |
|---|---|---|---|---|---|
| c7dev.vm-7520.int.azahoth.net | CentOS Linux 7 (Core) | None | 8 | Intel(R) X4on(R) CPUE3-1505M v6 @ 3.00GHz | No |

|< < 1-1 of 1 > >|

● Test    x | ● |TEST-19| Use of ioctl    x | +

← → ⟲ ⚠ Not secure | https://portal/alerts/TEST-19

ⓘ DEEPFACTOR    Applications    Alert Policies    Admin Settings

1600 ⟶

| P2 | ✧ Use of ioctl | | DISCOVERY |
|---|---|---|---|
| | | | Component: jdk11 |
| DESCRIPTION | | | Application: Test |
| | | | Occurrences: 2 |
| The program has used the ioctl() API. The ioctl() API is typically used to control | | Reported | Last Observed At: Jun 02,2020, 12:03:49 AM |
| hardware devices, and its use is uncommon in internet-facing web applications. | | Acknowledged | |
| Use of ioctl() may indicate an attempt by an attacker to control hardware | | Not an Issue | Versions: Manual Build | Jun 01, 2020, 11:51:53 PM| |
| devices on the machine, especially or services running as the 'root' user. | | | |
| | | | RISK |
| RESOLUTION | | | Category: Process / Improper Use Of System Calls |
| Use of ioctl() is uncommon: if the application does need to control hardware | | | |
| devices or pseudo-devices, this alert may simply indicate normal behaviour. An | | | Severity: P2 |
| audit of the application source code is warranted if the above characterization is | | | |
| not true. | | | JIRA |
| | | | Integrate Deepfactor with your JIRA Account to create an issue for this alert. Go to Integrations |
| | | | Comments |
| | | | Add a comment |

FIG. 16A

SYSTEMS, METHODS, AND COMPUTER-READABLE MEDIA FOR ANALYZING INTERCEPTED TELEMETRY EVENTS

This patent application claims the benefit of U.S. Provisional Patent No. 62/878,490, filed Jul. 25, 2019 and U.S. Provisional Patent No. 62/878,502, filed Jul. 25, 2019, both disclosures of which are incorporated herein in their entireties.

TECHNICAL FIELD

This can relate to systems, methods, and computer-readable media for intercepting telemetry events obtained during operation of an application and analyzing the telemetry events.

BACKGROUND

Problems such as security flaws, run-time errors, or other issues can plague production releases of software in ways that were not contemplated during development of the software. When such software encounters such problems, an update or patch is required fix the issue. A software development tool is needed to thoroughly test and analyze the software before it is released.

SUMMARY

Systems, methods, and computer-readable media for intercepting telemetry events obtained during operation of an application and analyzing the telemetry events.

In one embodiment, a method for intercepting events being executed by an application, the application associated with a native library include code for one or more components that are called by the application during runtime is provided. The method can include executing a telemetry interception and analysis platform (TIAP) runtime when the application initiates startup. Execution of the TIAP runtime can include intercepting a call by the application using one of an interception library or a loader having the interception library integrated therein; collecting parameters of the call as a telemetry event; trampolining the call to the native library after collecting the telemetry event to enable the application to perform the call as originally intended; and transmitting the telemetry event to a TIAP portal.

In one embodiment, the interception library can include at least one sealed component corresponding to a respective counterpart component included in the native library, wherein each sealed component is operative to collect the parameters of a call and initiate the trampolining of that call to the respective counterpart component in the native library.

In one embodiment, the TIAP runtime can cause the application to transmit calls to the interception library in lieu of transmitting calls to the native library.

In one embodiment, execution of the TIAP runtime can include batch transmitting a plurality of collected telemetry events to the TIAP portal.

In one embodiment, the method can further include executing a system call responsive to the call to the native library.

In one embodiment, a quantity of parameters collected for the telemetry event is controlled by a selected one of a plurality of telemetry levels.

In one embodiment, the telemetry event is packaged according to a specific message structure comprising an event envelope and an event body.

In one embodiment, the event envelope can include at least one of a component ID and an event ID.

In one embodiment, the event body can includes a structure uniquely formatted for each one a plurality of different event types.

In one embodiment, the plurality of different event types are selected from the group consisting of a component start event, a component end event, a file event, a network event, a network change event, a memory event, a process event, a metadata event, and a third party API usage event.

In one embodiment, a computer-readable storage medium containing program instructions for a method for intercepting events being executed by an application is provided. The application associated with a native library includes code for one or more components that are called by the application during runtime, wherein execution of the program instructions by one or more processors of a computer system causes the one or more processor to perform steps including executing a telemetry interception and analysis platform (TIAP) runtime when the application initiates startup. Executing the TIAP runtime can include intercepting a call by the application using one of an interception library or a loader having the interception library integrated therein; collecting parameters of the call as a telemetry event; trampolining the call to the native library after collecting the telemetry event to enable the application to perform the call as originally intended; and transmitting the telemetry event to a TIAP portal.

In one embodiment, a method for configuring an application to operate in conjunction with a telemetry interception and analysis platform (TIAP) is provided. The method can include receiving an instrumentation command via a user interface to create a sealed output file of an application, wherein the application comprises a plurality of components, and wherein the user interface communicates with the TIAP; registering the plurality of components with the TIAP to correlate each component with a corresponding one of a plurality of interception codes; receiving the plurality of interception codes from the TIAP; receiving TIAP runtime code from the TIAP; storing the interception codes in an interception library, and where each interception code comprises at least one telemetry grammar and a trampoline function; and generating a sealed output file comprising the interception library and the TIAP runtime code.

In one embodiment, the application can include application executable code.

In one embodiment, the sealed output file comprises the application executable code, and wherein the TIAP runtime code includes a loader that instructs the application to direct all calls to the interception library.

In one embodiment, the TIAP runtime code can include a launcher that instructs the application to direct all calls to the interception library, and wherein the sealed output file does not include the application execution code.

In one embodiment, the at least one telemetry grammar defines an API or function call to intercept and record as a telemetry event.

In one embodiment, the at least one telemetry grammar is selected from a library of telemetry grammars hosted by the TIAP.

In one embodiment, the at least one telemetry grammar is generated by a customer interacting with the user interface.

In one embodiment, the user interface is a command line interface.

In one embodiment, the trampoline function redirects a call from the interception library to a native library associated with the application such that the call is implemented as originally intended.

In one embodiment, a computer-readable storage medium containing program instructions for a method for configuring an application to operate in conjunction with a telemetry interception and analysis platform (TIAP) is provided. Execution of the program instructions by one or more processors of a computer system causes the one or more processor to perform steps including receiving an instrumentation command via a user interface to create a sealed output file of an application, wherein the application comprises a plurality of components, wherein the user interface communicates with the TIAP; registering the plurality of components with the TIAP to correlate each component with a corresponding one of a plurality of interception codes; receiving the plurality of interception codes from the TIAP; receiving TIAP runtime code from the TIAP; storing the interception codes in an interception library, and where each interception code comprises at least one telemetry grammar and a trampoline function; and generating a sealed output file comprising the interception library and the TIAP runtime code.

In one embodiment, a telemetry interception and analysis platform (TIAP) system is provided that includes a server for running a TIAP portal comprising an event service operative to receive telemetry events from a TIAP runtime being executed on a customer computer system in conjunction with an application being executed on the customer computer system, wherein the TIAP portal further comprises an analytics service operative to analyze the telemetry events and generate a plurality of analytics outputs for display in a user interface based on analysis of the telemetry events, and wherein the TIAP portal further comprises an API service operative to process commands received via the user interface, including commands that control how the plurality of analytics outputs are displayed.

In one embodiment, the telemetry events are intercepted at a library level within a software stack running on the customer computer system, and wherein each telemetry event is associated with a particular instance of a particular component being called by the application.

In one embodiment, the analytics service is further operative to analyze how components interact with each other.

In one embodiment, the API service is further operative to register each component associated with the application and provide interception code corresponding to each component to the customer computers system.

In one embodiment, the interception code comprises at least one telemetry grammar and a trampoline function.

In one embodiment, the at least one telemetry grammar is selected from a default set of telemetry grammars or a customer generated telemetry grammar.

In one embodiment, the plurality of analytics outputs includes alerts, metrics, suggested corrective measures, and insights.

In one embodiment, the analytics service includes a plurality of alert criteria that define conditions for triggering an alert based on telemetry events.

In one embodiment, the plurality of alert criteria comprise a default set of criteria, a customer generated set of criteria, or a machine learned set of criteria.

In one embodiment, the TIAP portal is operative to provide the TIAP runtime to the customer computer system.

In one embodiment, the UI is configured to display information in a hierarchical format ranging from a top-level view to a bottom-level view, with at least one middle-level view presented therebetween.

In one embodiment, the top-level view comprises a dashboard that displays all applications associated with a customer, a total number of components being run by all applications, and a total number of alerts associated with all applications.

In one embodiment, a first middle-level view includes an application view that displays information for a single application.

In one embodiment, a second middle-level view includes a component view that displays information for a single component associated with the application.

In one embodiment, the bottom-level view comprises an instance view that displays information for a single instance of a given component of the application.

In one embodiment, a method for operating a telemetry interception and analysis platform (TIAP) system is provided for receiving telemetry events from a TIAP runtime being executed on a customer computer system in conjunction with an application being executed on the customer computer system, analyzing the telemetry events to generate a plurality of analytics outputs for display in a user interface based on analysis of the telemetry events, and processing commands received via the user interface to cause the TIAP system to perform a desired operation, including commands that control how the plurality of analytics outputs are displayed.

In one embodiment, the telemetry events are intercepted at a library level within a software stack running on the customer computer system, and wherein each telemetry event is associated with a particular instance of a particular component being called by the application.

In one embodiment, the method further includes registering each component associated with the application and provide interception code corresponding to each component to the customer computers system.

In one embodiment, the interception code includes at least one telemetry grammar and a trampoline function.

In one embodiment, the at least one telemetry grammar is selected from a default set of telemetry grammars or a customer generated telemetry grammar.

In one embodiment, the plurality of analytics outputs comprises alerts, metrics, suggested corrective measures, and insights.

In one embodiment, the analyzing further includes accessing a plurality of alert criteria that define conditions for triggering an alert based on telemetry events.

In one embodiment, the plurality of alert criteria comprise a default set of criteria, a customer generated set of criteria, or a machine learned set of criteria.

In one embodiment, the method further includes providing the TIAP runtime to the customer computer system.

In one embodiment, the UI is configured to display information in a hierarchical format ranging from a top-level view to a bottom-level view, with at least one middle-level view presented therebetween.

In one embodiment, the top-level view includes a dashboard that displays all applications associated with a customer, a total number of components being run by all applications, and a total number of alerts associated with all applications; wherein a first middle-level view comprises an application view that displays information for a single application; wherein a second middle-level view comprises a component view that displays information for a single component associated with the application; and wherein the bottom-level view comprises an instance view that displays information for a single instance of a given component of the application.

This Summary is provided to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The above and other aspects of the disclosure, its nature, and various features will become more apparent upon consideration of the following detailed description, taken in conjunction with the accompanying drawings, in which like reference characters may refer to like parts throughout, and in which:

Figure 12A:
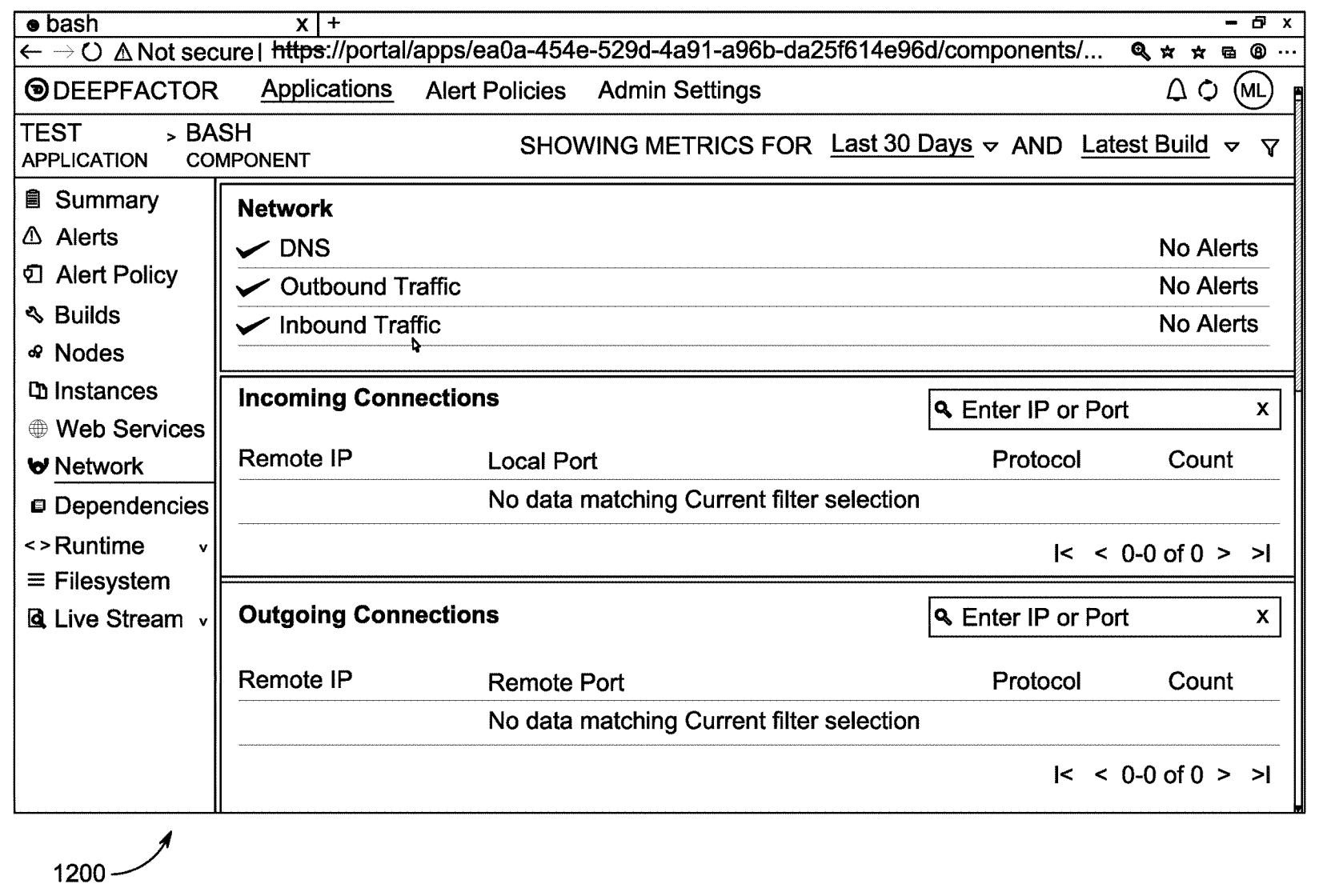

FIGS. 9, 10, 11, 12A, 12B, 13A, 13B, 14, 15, 16, and 16A show different UI views according to various embodiments.

DETAILED DESCRIPTION

Figure 1:
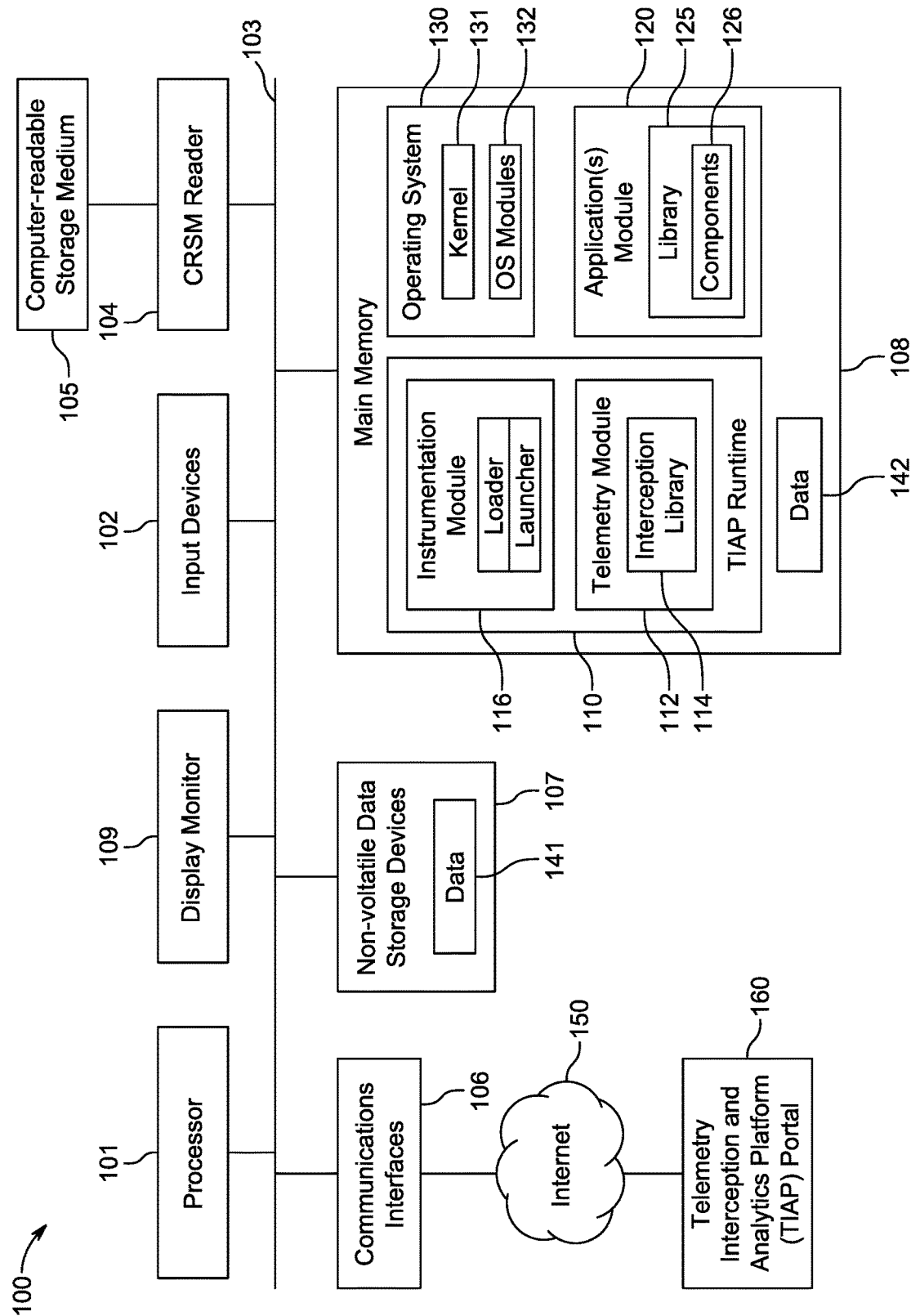
FIG. 1 shows a schematic diagram of an example computer or server in accordance with an embodiment.

Systems, methods, and computer-readable media for evaluating a software application are provided and described with reference to FIGS. 1-21. The application is evaluated using a telemetry interception and analysis platform according to embodiments discussed herein.

As defined herein, an alert is an abnormal condition that has been identified by an analytics service, based on a rule defined in an alert grammar.

As defined herein, an alert grammar includes a set of rules or parameters that are used to classify telemetry events obtained by a telemetry interception and analysis platform (TIAP) during operation of an application. The set of rules can be part of default set of rules provided by the TIAP, generated by a customer using the TIAP, heuristically learned rules created by machine learning, or any combination thereof. Other grammars may be used by the TIAP such as, for example, insight grammars, performance grammars, and warning grammars. Yet other grammars can include compliance grammars that search telemetry data for specific items such as, for example, credit card numbers, personally identifiable information (PII), addresses, bank accounts, etc.

As defined herein, an analytics service refers to one of many services handled by the TIAP and operative to perform analytics and telemetry events collected from an application. The analytics service may reference an alert grammar, insight grammar, performance grammar, or any other grammar to evaluate collected telemetry events.

As defined herein, an application refers to a top hierarchy level of monitoring by the TIAP. An application includes one or more component groups and represents a complete implementation of a top-line business application.

As defined herein, an API Server is a service that implements endpoint APIs (REST-based) for use by user interface (UI) and command line interface (CLI) tools.

As defined herein, a blueprint service analyzes recorded telemetries for one or more components and creates alert rules based on what has been seen. The blueprint service can be used to define behavioral blueprints that describe the intended behavior of an application (e.g., how an application should be behave, what it should do, and what it should not do).

As defined herein, a component is abstract definition of a single type of process known to the platform (e.g., "database" or "web server"). An application can operate using one or more components.

As defined herein, a component instance is an individual concrete example of a component, running on a specific host or a virtual machine (e.g., "database running on myserver.corp.com"). One or more instances may occur for each component.

As defined herein, a component group is a collection of all instances of a given component (e.g., "all databases in application x").

As defined herein, a common vulnerability and exposure (CVE) is system that provides a reference-method for publicly known information-security vulnerabilities and exposures. The National Cybersecurity FFRDC, operated by the Mitre Corporation, maintains the system, with funding from the National Cyber Security Division of the United States Department of Homeland Security. The system was officially launched for the public in September 1999. The Security Content Automation Protocol uses CVE, and CVE IDs are listed on MITRE's system as well as in the US National Vulnerability Database.

As defined herein, a CVE service is a platform service that periodically ingests CVE metadata and analyzes if any components are vulnerable to any known CVEs.

As defined herein, a dashboard can refer to a main screen of a TIAP portal UI.

As defined herein, an event service is a service that responds to telemetry event submissions using a remote call (e.g., gRPC or representational state transfer (REST)) and stores those events in an events database.

As defined herein, a housekeeping service is a service that periodically removes old data from logs and databases.

As defined herein, an insight is a noncritical condition that has been identified by the analytics service, based on a rule defined in a grammar. Insights are typically suggestions on how performance or other software metrics can be improved, based on observed telemetries.

As defined herein, a native library refers to a collection of components or code modules that are accessed by the application.

As defined herein, an interception library is created by the TIAP and is used to intercept API calls by the application and record the API calls as a telemetry event. The interception library can trampoline the original API call to the native library. The interception library can include the same functions of the native library or subset thereof and any proprietary APIs, but is associated with analysis platform and enables extraction of telemetry events related to operation of the application. When a function is called in the interception library, the telemetry event collection is performed and actual code in the native library is accessed to implement the function call.

As defined herein, a TIAP portal may refer to a surveillance as a Service (SaaS) or on-premise management server that host TIAP, including the dashboard and other TIAP UI screens, as well as any services required to set up installation of TIAP runtime code to monitor a customer's application, collect telemetry from the customer's application, and analyze collected telemetry.

As defined herein, a metric can refer to telemetry data collected that includes a numeric value that can be tracked over time (to form a trend).

As defined herein, a policy may be a security ruleset delivered to the runtime during initial communication/startup that describes desired tasks that are to occur when certain events are detected (e.g., block/allow/warn).

As defined herein, TIAP runtime or Runtime refers to a code module that runs within a sealed process' (component instance) address space and provides TIAP services (e.g., telemetry gathering, block actions, etc.).

As defined herein, a sealer is software tool that combines a customer's executable code with the runtime code to produce a sealed binary output that is then used in place of the original executable code.

As defined herein, a trampoline or trampoline function is a runtime internal technique of hooking/intercepting API/library calls used by a component.

As defined herein, a trend is a change of metric values over time.

As defined herein, a warning is an abnormal condition that may not be critical, that has been detected by the analytics service, based on a rule defined in an alert/insight/warning grammar.

FIG. 1 shows a schematic diagram of an example computer or server in accordance with an embodiment. The computer or server of FIG. 1 may have less or more components to meet the needs of a particular application. As shown in FIG. 1, the computer may include a processor 101. The computer may have one or more buses 103 coupling its various components. The computer may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., cathode ray tube, flat panel display), communications interfaces 106 (e.g., network adapters, modems) for communicating over computer networks, one or more non-volatile data storage devices 107 (e.g., hard disk drive, optical drive, FLASH memory), and a main memory 108 (e.g., RAM). Software embodiments may be stored in a computer-readable storage medium 105 for reading into a non-volatile data storage device 107 or main memory 108. Data may be stored in data storage device 107 as data 141 or memory 108 as data 142. Software embodiments may also be received over a network, such as Internet 150 by way of a communications interface 106. In the example of FIG. 1, main memory 108 includes many different software modules. Note that these software modules may also run in data storage locations other than main memory.

The operating system 130 may include a UNIX-like operating system, such as the Linux operating system, iOS operating system, Mac OSX operating, or Windows operating system. Operating system 130 can include a kernel 131 and operating system modules 132. Operating system modules 132 can include components of operating system 130 other than kernel 131.

Other modules can include TIAP runtime module 110, telemetry module 112, instrumentation module 116, and applications module 120. Application module 120 may include computer-readable code for executing an application running on computer 100. The code may include executable code (e.g., a .exe file). Application module 120 may include a native library 125 (e.g., Libc.so) that is used during operation of the application. Native library 125 may include one or more components 126.

TIAP runtime module 110 may include computer readable code for executing operation of telemetry module 112 and instrumentation module 116, referred to herein as TIAP runtime or TIAP runtime code. TIAP runtime module 110 may include the TIAP runtime operative to collect telemetry events and provide the collected telemetry events to TIAP portal 160 via Internet 150.

Telemetry module 112 can include computer-readable code that is operative to intercept application programming interface (API) calls originating from the application at the library level within the software stack and capture such calls as telemetry events that are provided to TIAP 160 for further analysis. Telemetry module 112 may include an interception library 114. Interception library 114 may include interception code and trampoline functions corresponding to each component or API called by the application. The TIAP runtime can interpose on any function in any library used by any component by inserting interception hooks or trampoline functions into the application's dependency chain (e.g., IAT/PLT/GOT). These trampoline functions redirect control flow from the native library API functions to the TIAP runtime, which then collects information about the API request (parameters, call stack information, performance metrics, etc.) as telemetry events, and then passes the original call to the native library. The interception code is responsible for collecting the parameters needed for the telemetry event. Telemetry events can be continually monitored by the TIAP runtime. Each component instance is continually monitored by the TIAP runtime and the desired telemetry events are captured and sent to TIAP portal 160 Telemetry events can be collected into batches and periodically sent to the TIAP portal for later analysis. The batching capability of the platform runtime can be further subdivided into prioritized batches—this entails creating multiple event queues that are sent with varying priorities to TIAP portal 160. This subdivision is useful in scenarios where the runtime is only allotted a small amount of CPU/memory/ network bandwidth (as to not interfere with efficient application execution). In the case where events may be dropped (due to not having sufficient resources), the TIAP runtime can instead collect a count of "missed events" that can be later communicated to the management platform when resources are available. This count provides the system administrator with a sense of how many events may be missing from the overall report provided by TIAP portal 160.

Instrumentation module 116 may be operative to seal or package the necessary files and/or library associated with an application with files and/or library associate with platform 118 into a loader, launcher, or executable file that enables telemetry module 112 to extract telemetry events from the application during TIAP runtime.

TIAP portal 160 may perform analytics on the collected telemetry events and generate visuals for display to users of computer 100 based on the analytics obtained from the analysis of the application.

Figure 2:
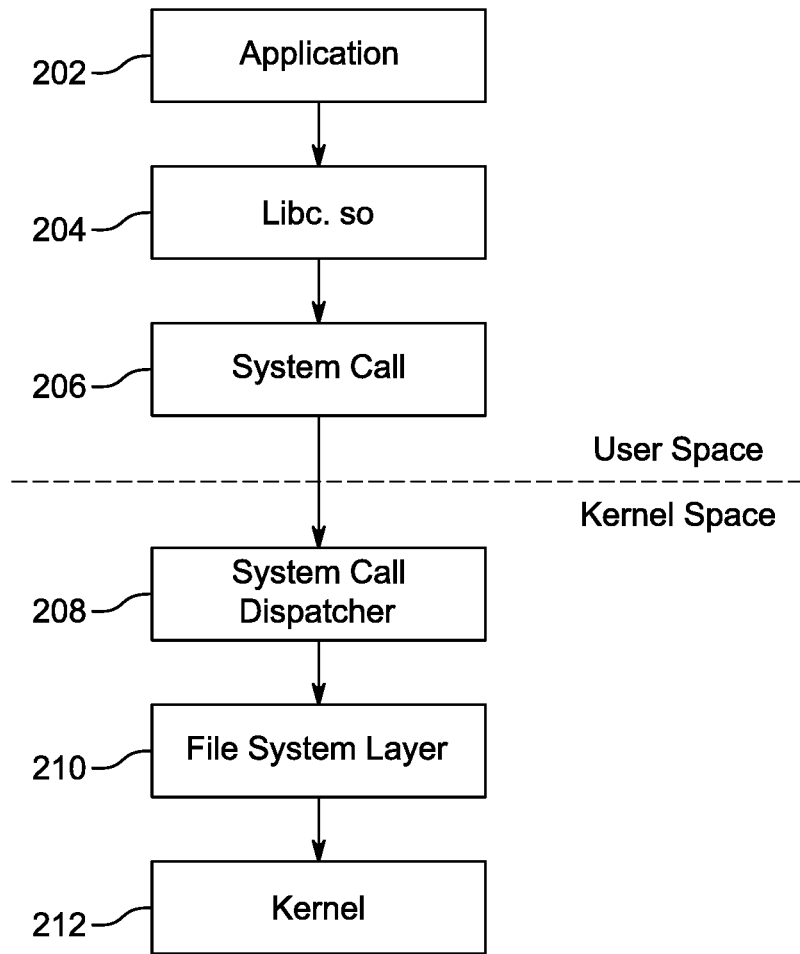
FIG. 2 shows a conventional flow of API calls originating from an application in a generic software stack.

FIG. 2 shows a conventional flow of API calls originating from an application in a generic software stack. System memory in UNIX-like operating systems may be divided into two distinct regions, namely kernel space and user space. FIG. 2 shows the user space and the kernel space demarcated by the dashed line. Kernel space is where the kernel executes and provides its services. User space is where a user process (i.e., all processes other than the kernel) executes, a process being an instance of an executing program. The kernel manages individual user processes within the user space and prevents them from interfering with each other. A user process typically cannot access kernel space or another user process's user space. However, an active user process may access kernel space by invoking a system call.

Starting with block 202, an application can make an application programming interface (API) call (e.g., open, write, read, etc.). That call is passed to block 204 where a library (e.g., Libc.so) is accessed to execute the API call. The library can contain subroutines for performing system calls or other functions. At block 206, a system call is invoked. The system call may be a modification of an existing system call generally available from the operating system. For example, the system call may be a modified version of the ioctl system call. The system call may be invoked by filling up register values then asserting a software interrupt that allows trapping into kernel space. For example, block 206 may be performed by a C language program that runs in the Linux operating system. The C language program may move the system call's number into the register of a processor and then assert an interrupt. The invocation of the system call can be made using a programming language's library system call interface. In one embodiment, the invocation of the system call is made using the C programming language's library system call interface.

In block 208, the invocation of the system call executes a trap to enter the kernel space. The system call dispatcher gets the system call number to identify the system call that needs to be invoked.

In block 210, the system call dispatcher vectors branches to the system call, which in the example of FIG. 2 involves a file operation. Accordingly, the system call is executed through the operating system's file system layer. The file system layer may be the Virtual File System (VFS) layer of the Linux operating system, for example. During blocks 208 and 210, the kernel stack gets populated with information that allows the processor to execute the instructions relating to the system call. Such information may include the return address of the system call and the system call table address. In block 212, the system call invoked in block 206 is executed in the kernel.

Figure 3:
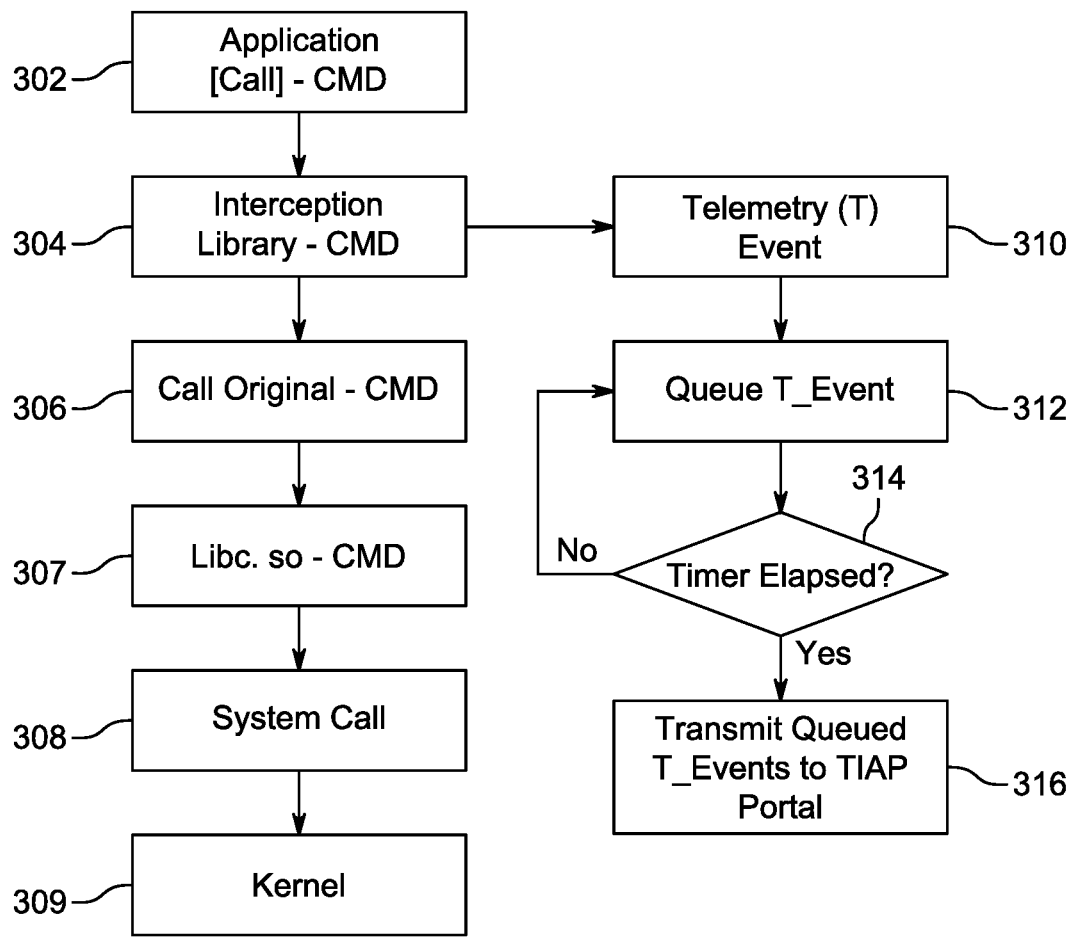
FIG. 3 shows a flow diagram for intercepting calls at the API/library level according to an embodiment.

The TIAP according to embodiments discussed herein can intercept operations originating from the application at the library level of the software stack. This is in contrast with conventional hook operations that intercept at the system call level or somewhere within the kernel space, typically accessed using Extended Berkeley Packet Filter (eBPF). Hooks using eBPF are often subject to various issues such as software updates to parts of the software stack that require special permissions, administrator permissions, or lack of API assurance that can result in breaking the application. Therefore, to eliminate such issues, embodiments discussed herein intercept at the library level. Referring now to FIG. 3, a flow diagram for intercepting calls at the API/library level according to embodiments discussed herein is shown. Starting at block 302, an application makes an API call to execute a particular command (shown as CMD). The command is passed to an interception library at block 304. The interception library is interposed between the application call and the native library associated with the application (block 308). The application is programmed via an instrumentation or sealing process (e.g., performed by instrumentation module 116) to interact with the interception library first before calling the original command with the native application.

The interception library can include the same functions of the native library or subset thereof and any proprietary APIs, but is associated with analysis platform and enables extraction of telemetry events related to operation of the application. When a function is called in the interception library, the telemetry event collection is performed and actual code in the native library is accessed to implement the function call. Telemetry events are shown in block 310. The interception library can enable all parameters of the API call to be recorded in a telemetry event. For example, if the API call is an OPEN command, the parameters can include file path, permissions, identification information, environmental information, etc. Since applications are continually monitored using embodiments discussed herein, telemetry events are constantly being collected and provided to the TIAP portal (e.g., portal 160). For example, the telemetry events may be queued at block 312 and batch transmitted to the analysis platform (block 316) each time a timer elapses at decision block 314. The TIAP portal can be run locally on the same device that is running the application or the analysis platform can be run remotely from the device running the application. In the remote case, the telemetry events may be transmitted via a network connection (e.g., the Internet) to the TIAP portal.

Telemetry events collected by the TIAP runtime can be buffered in memory into a lock-free queue. This requires little overhead during sealed program execution as the telemetry upload occurs less frequently. The size of the event queue is determined by a setting periodically refreshed by the TIAP portal. The customer is permitted to set the amount of memory and CPU overhead that the TIAP runtime can consume. The TAP runtime can adjust the size of the event queue and the quality of data measured accordingly. In the case that events need to be dropped due to exceeding the allowed CPU/memory thresholds, a simple counter can be maintained to reflect the number of dropped events. When there is adequate resource available, the number of missed events is communicated to the TIAP platform. The buffer can be flushed periodically, depending on size and overhead constraints. This is done at event submission time (e.g., any event can potentially trigger a buffer flush). During flush, the events in the queue are batched and sent to an event service in the TIAP portal using REST or gRPC. The TIAP runtime can also support a high-priority queue, for urgent events/alerts.

The TIAP runtime may be required to handle special cases. The special cases can include handling signals, handling dynamic library loads, and handling fork and exec functions. Signal handling is now discussed. Telemetry events occurring during signal handling have to be queued in a way that uses no signal-unsafe APIs; this is the exception to the rule that that any event can cause a buffer flush. All trappable signals are caught by the runtime. The runtime increments counts of received signals for periodic upload to the management portal. In order to support the component's own use of signals, the runtime retains a list of any handlers the component registers using sigaction and invokes those handlers upon receiving a signal. This may require removing a stack frame before calling the handler.

The runtime intercepts calls to the dlsym, dlopen, and other dynamic library load routines. These loaded libraries are subject to the same telemetry grammar treatment as during initial load. Calls to these functions also may result in telemetry events of their own.

The fork and exec functions require special treatment. Fork can result in an exact copy of the process being created, including a TIAP runtime state. In order to support fork properly, the fork call is intercepted and the following sequence of operations is performed: a fork telemetry event is sent (if such a telemetry grammar exists), the child's event queues are cleared, and the child's instance ID is regenerated. This sequence of steps ensures that the TIAP portal sees a clean set of telemetries from the child. The exec function requires other special treatment. On exec, the following sequence of operations is performed: the original arguments to exec are preserved, the arguments to exec are changed to point to the current program (e.g., the program that is already sealed), with no command line arguments and an environment variable named DF_EXEC set to the original arguments supplied by the caller. As a result, the operating system re-executes the same program, causing the runtime to restart itself. Upon seeing DF_EXEC set, the runtime will launch the original program defined in the call to exec, with runtime protection.

Immediately after the application call is sent to block 304, the original call command is invoked at block 306. Calling the original command is necessary to allow the application to operate as intended. The operations in blocks 304, 306, 310, 312, 314, and 316 may be executed by TIAP runtime module 110 or telemetry module 112. The original call command accesses the native library at block 307. This leads to a system call at block 308, and then access to the kernel at block 309.

It should be understood the flowchart can be implemented in any process being used by a customer application product. For example, the flowchart can be implemented in a web server, a database, middleware, or any other suitable platform being used by the application. That is, the same interception library can be used in all processes. This enables a history of the stack trace to be captured and analyzed.

Figure 4:
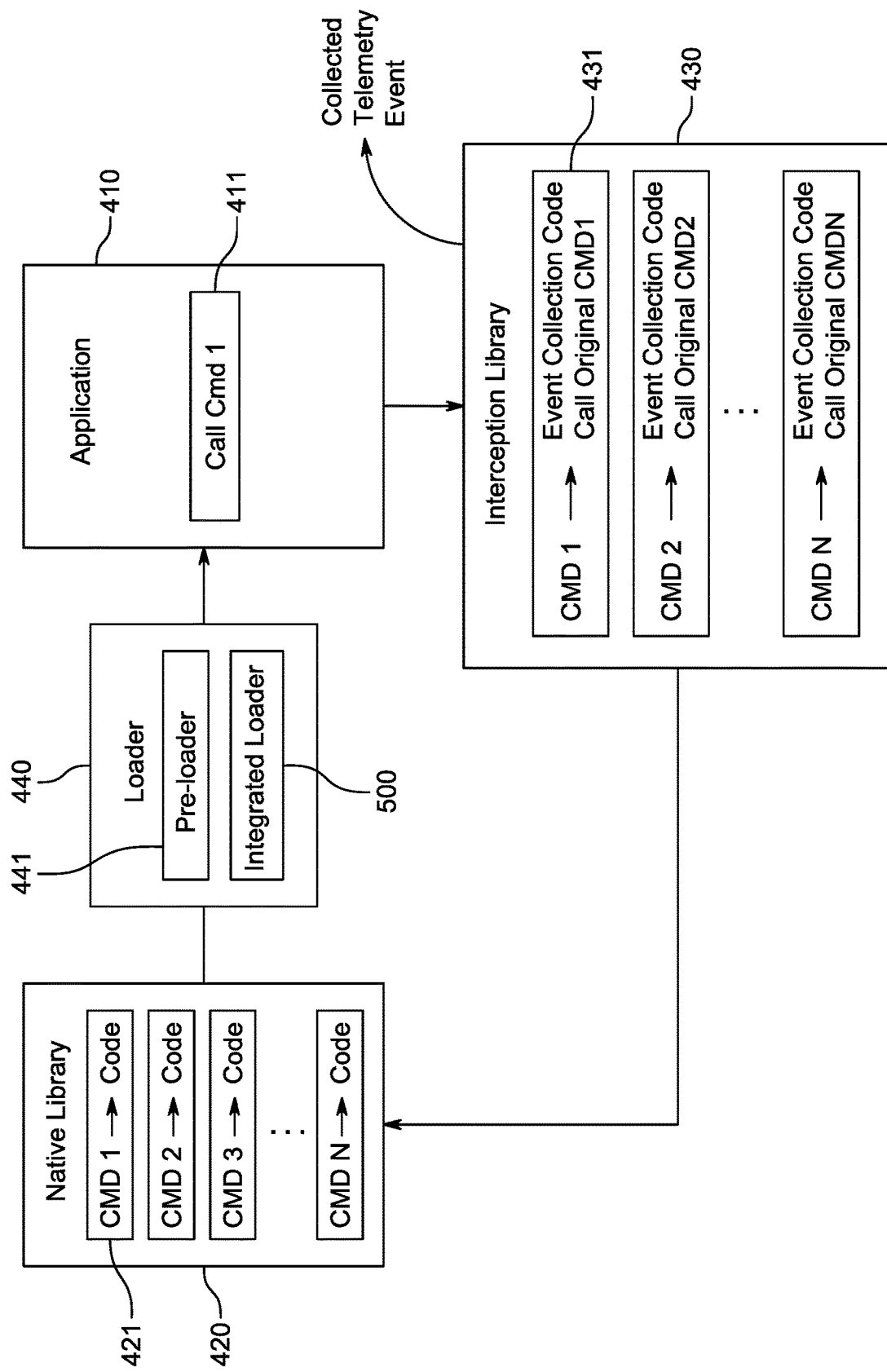
FIG. 4 shows an illustrative block diagram of how the application calls are intercepted, how event telemetry is collected, and how the application calls are executed according to an embodiment.

FIG. 4 shows an illustrative block diagram of how the application calls are intercepted, how event telemetry is collected, and how the application calls are executed according to an embodiment. The application is shown in block 410 and the native library associated with the application is shown in block 420. Native library 420 can include code for N number of commands, functions, or binaries (shown here as CMD1, CMD2, CMD3, and so on). Each command is associated with its own code (as shown) for implementing the command. When application 410 is running, it can call a command (e.g., call CMD1 411). FIG. 4 also shows an interception library in block 430. Interception library 430 can include a copy of each command contained in the native library. The copied commands may not contain the actual code of the native library commands but can include event collection code (or interception code) that enables telemetry associated with the application call to be collected. After the telemetry event is collected, the original command called by the application is called using a trampoline function. The interception code can include the trampoline function and telemetry grammars that define what parameters to collect. For example, assume application 410 calls CMD1 411. In response to call of CMD1 411, CMD1 431 in interception library 430 is accessed, and the telemetry event associated with call CMD1 411 is collected. After the event is collected, the original CMD1 421 is called using a trampoline function and the application call of CMD 411 is executed. In a trampoline function, call CMD1 411 initially goes to interception library 430 and then trampolines to native library 420.

Loader 440 can enable application 410 to load code in a library to be executed. For example, assuming that interception library is not present and the call CMD1 411 is called. The loader would load the code 421 in native library so that the CMD1 operation could be executed. However, in the embodiment illustrated in FIG. 4, interception library 430 is present and must be the first library accessed in response to a call by application 410. One way to ensure that interception library is accessed first is to set a pre-loader (e.g., preloader 441) to interception library 430. The preloader is commonly referred to as LD_PRELAOD. For example, LD_PRELOAD is set to Interception Library. This results in pre-loader instructing loader 440 to access interception library 430 first before accessing any other libraries such as native library 410.

An alternative to using a preloader is to use an integrated loader (e.g., integrated loader 500) for each application. This integrated loader can eliminate a few potential issues that may exist with using the preloader. For example, a customer could turn the preloader off, which would prevent telemetry collection because the interception library would not be accessed first. Another potential issue that can arise using the preloader is that other resources may use it, thereby potentially causing who goes first management issues. In addition, if an application uses static linking (e.g., where code in the native library is copied over to the application), the preloader will not work.

Figure 5:
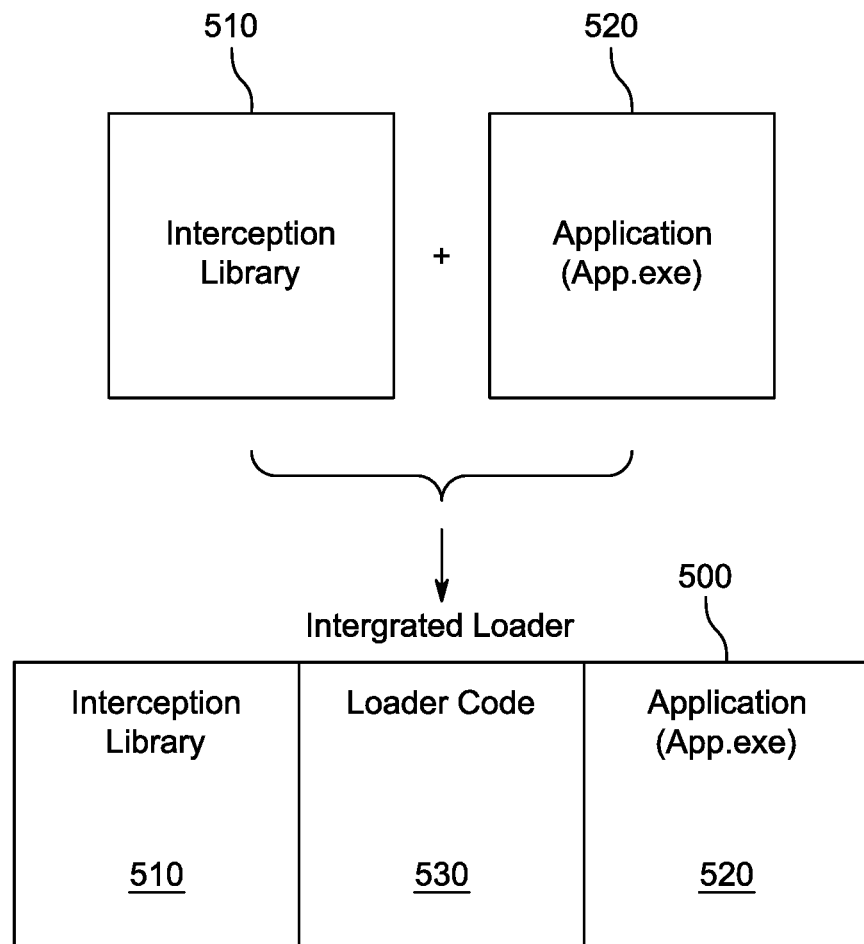
FIG. 5 shows an illustrative block diagram of an integrated loader according to an embodiment.

FIG. 5 shows an illustrative block diagram of an integrated loader according to an embodiment. Integrated loader 500 can be a combination of an interception library 510, an application 520, and loader code 530. When integrated loader is run, interception library 510 is first accessed, and then loader 530 is accessed to load application 520 without requiring any external dependencies. When integrated loader 500 is used, the same flow as described above in connection with FIG. 4 is used. That is, when the application makes a call, that call is intercepted by the interception library (and event telemetry is collected) and the original call is executed. Integrated loader 500 can be a custom built loader that does in-place trampolining based on IAT (import address table)/GOT (Global Object Table)/PLT (Procedure Linking Table) fixups. In some embodiments where static binaries are used, integrated loader 500 can execute hunt-and-replace fixups for static binaries as opposed to using load-time fixups.

Figure 6:
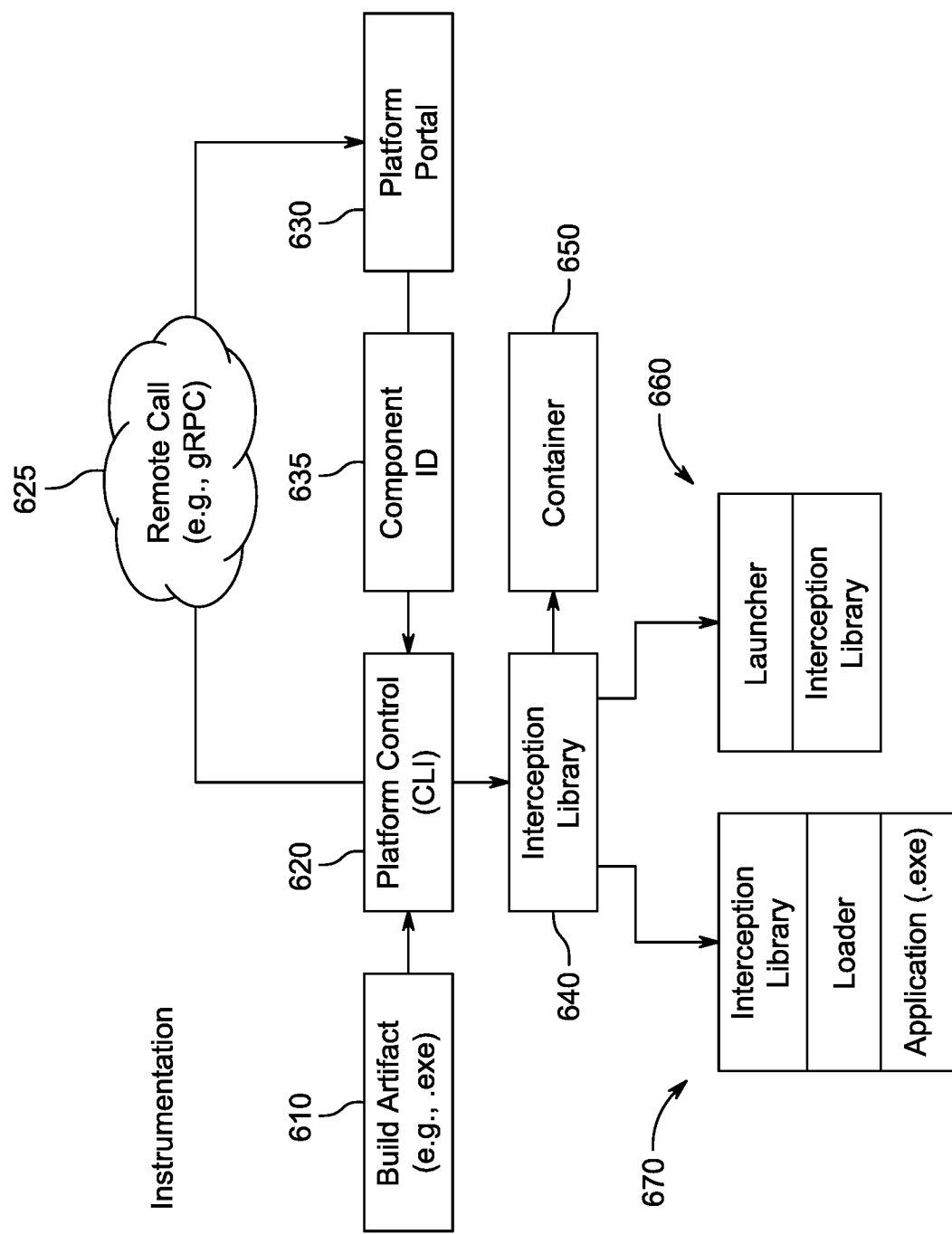
FIG. 6 shows an illustrative block diagram of an instrumentation module or sealing module according to an embodiment.

FIG. 6 shows an illustrative block diagram of an instrumentation module or sealing module according to an embodiment. A process called sealing or instrumentation is performed to merge a customer application (i.e., application executable) with the TIAP to produce a new "sealed" build output. The sealed result is executable code unique to the customer. Sealing combines the TIAP runtime (e.g., interception library), the customer build artifact (i.e., customer application), an optional loader, and an optional security policy, and outputs a new binary that is a drop-in replacement for the original customer build output. The replacement executable code is used to provide telemetry collection and optionally, policy enforcement. Customers may also optionally seal parts of their application that are not self-built (e.g., sealing a database engine or web server binary is possible). FIG. 6 shows build artifact (e.g., a component binary or the application executable) in block 610, a command line interface in block 620, remote call in block 625, the TIAP portal in block 630, component ID in block 635, interception library in block 640, a container in block 650, a launcher in block 660, and integrated loader in block 670.

The sealer is a program that is built on the TIAP and downloaded by a user to their workstation or build infrastructure machine. The sealer is typically part of a command line interface tool. In some embodiments, command line interface (CLI) tool 620 can be custom built for each customer as it will seal components for that customer only. In other embodiments, CLI tool 620 is generic tool provided to each customer that enables the customer to build a different interception library for each application. The TIAP 630 can create the custom CLI tool (containing the sealing function) by using a link kit installed in the portal. The link kit includes a set of object files (.o files) that are linked against a customer-specific object file built on demand (from a dynamic code generation backend placing various statements into a .c file and compiling to an object file). This produces a customer specific CLI tool that contains all information required to produce a sealed binary keyed to the customer that downloaded the CLI tool. This per-customer approach to CLI tool generation eliminates the need for the customer/user to enter many tenant-specific details when sealing components. The CLI tool may also contain any SSL certificates or other items required for a secure transaction with the management portal. In other approaches, the SSL certificates can be obtained from an "API token," which substitutes embedding the SSL certificate into CLI tool 620. The CLI tool can provide several functions: sealing, showing/managing applications and components, showing telemetry events, showing audit logs, and showing alerts and metrics At a high level, the CLI tool offers a command line interface to much of the same functionality offered by the web UI provided by the TIAP portal.

During sealing, CLI 620 can receive build artifact 610 and generate interception library 640 by developing interception code for each component in the build artifact 610. The interception code can include telemetry grammars that define which events should be monitored for and recorded. The interception code can also include a trampoline function that transfers the application call to the native library so that the original call by the application is executed as intended. That is for each component of an application, application executable, or build artifact, a TIAP based interception code is generated and included in interception library 640. For example, if first command code is being processed, CLI 620 can send that first command to platform portal 630 via remote call 625. Portal 630 can assign that command a component ID 635 and pass it back down to CLI 620. This way when telemetry events are collected, the component ID will match with the component ID assigned by portal 630. CLI 620 can populate interception library 640 with each component of build artifact 610. When the interception library is complete, CLI 620 can provide the sealed output to container 650, launcher 660, or integrated loader 670. Container 650 can be a class, a data structure, or an abstract data type whose instances are collections of other objects. Launcher 660 is akin to the preloader concept discussed above in connection with FIG. 4. Loader 670 is akin the integrated loader concept discussed above in connection with FIG. 5.

Protection of non-executable artifacts is also possible. To protect interpreted scripts or languages, the sealer can provide a special launcher mode that produces a special sealed binary containing only the TIAP runtime. When using launcher mode, the sealed binary executes a command of the customer's choice, as if the command being executed was already contained within the sealed output. This allows for scenarios where interpreted languages are used and it is not determinable which interpreter may be present in the target (deployment) machine (as such interpreters may vary between the build environment and the deployment environment).

The CLI tool has various subcommands that are specified on the command line, such as 'seal', 'applications', 'components', etc. The seal subcommand can run in one of two modes: default and launcher. Each mode produces a different type of output file. In the default mode, which produces an integrated launcher of FIG. 5, the tool takes an input file (a binary file typically produced by the customer's build system or sourced from a trusted ISV), and produces a sealed output file containing TIAP runtime code, customer application executable code (e.g., customer binary), certificates, digital signatures, and telemetry grammar. The CLI tool can contain TIAP runtime code for many different architectures (e.g., amd64, i386, arm32, aarch64, etc.). The specific runtime to choose is determined by the architecture of the customer binary. Certificates can include other identity material for later use in secure communication with the TIAP during execution. The digital signature may be used to avoid tampering (on platforms which support this feature). The Component ID is assigned by the TIAP during the sealing operation and is part of the sealed output. As stated previously, the TIAP runtime is capable of collecting arbitrary telemetry events. The TIAP runtime inserts trampolines into a component based on a set of telemetry grammars that describe which APIs/functions to interpose on. A telemetry grammar can include a code module name (which is name of a native library or other executable code that the API of interest is associated), a function name (which is the name of the function to intercept), and parameter grammars (which can include none or one or more of the following: parameter number (which can include the ordinal position of the parameter (C calling convention ("left-to-right"))), parameter type (which is the data type of this parameter), and parameter size, which is the size of the data, if not known from its type)).

A list of telemetry grammars is built into the sealed component. This occurs at application registration time (e.g., during sealing, when the component and application are being registered with the TIAP). The TIAP can provide a preconfigured set of interesting/well-known telemetry grammars that are automatically available as part of this transaction. Customers can override, customize, or remove any of these grammars using a user interface in a TIAP management portal (or the CLI tool). Customers can also define their own telemetry grammars, if they wish to collect additional telemetries not present in the TIAP common set. The default set of telemetry grammars is stored in the TIAP's configuration database, and cloned/copied for each customer as they register with TIAP; this allows the customer to make any customizations to the default set they wish, if desired. Each set of customer-specific telemetry grammars are stored with the customer data in the configuration database (albeit separate from the default set or other customers' sets).

In launcher mode, the input is not specified using the -i argument, but rather with a -I (capital I). Launcher mode may be akin to the pre-loader of FIG. 4. This flag indicates that the subsequent command line parameter (after the -I) is to be interpreted as a command line that the runtime will launch. In launcher mode, the customer binary is not embedded with the sealed output. Rather, the sealing process outputs the TIAP runtime code, the component ID, certificates, digital signature, command line, and telemetry grammar. The specific runtime to choose is determined by the -a command line flag. In launcher mode, the TIAP will execute the command specified, and attach itself to the launched process subsequently. Launcher mode is intended for use in scenarios where the customer is reluctant to bundle the runtime code with a 3rd party interpreter (Java, Python, etc).

If the sealer is being run in default mode and a non-executable file is specified as an input, the sealer will abort and recommend launcher mode instead. If the sealer registers a component that already exists in the TIAP, the sealer will abort and inform the user of this.

During component registration, a set of telemetry grammars will be sent to the sealer from the TIAP. These telemetry grammars contain a list of the libraries and APIs that should be intercepted for this component.

Both sealing modes accept a -t argument that contains a freeform string to be interpreted by the platform as the build time tag. This will typically be a comma separated set of key value pairs that the customer can use to assign any metadata to this component. Note that build time tags are included in the determination of any duplicate components.

The TIAP runtime is executable code that runs at process launch. It is built as position-independent code (PIC) and/or position-independent executable (PIE), and self-relocates to a random virtual address immediately upon startup. The runtime first performs a self-integrity check (to the extent possible considering the platform in use), and then performs a one-time survey/data collection of the following information: platform query, kernel version, memory, CPU (number, type, and speed), NUMA information, distribution information, and network/hardware information. The runtime then performs a transaction with the TIAP portal, sending the aforementioned data as part of a "component start" event. The TIAP portal may reply to this event by (1) proceed with start or (2) do not start. Additionally, the TIAP portal can inform the component that the host software catalogue is out of date by returning such a status code along with the component start event reply.

A host software catalogue is a list of software packages and constituent files on the machine running the component, indexed by hostname and IP address. This information is periodically gathered and uploaded to the TIAP portal to assist with analytics (specifically a common vulnerabilities and exposures (CVE) service). This catalogue is periodically updated, and the TIAP portal will report back out of date if the catalogue does not exist at all, or if the component sealing date is later than the last catalogue update time, or if a set age threshold is exceeded (typically set to 1 week by default). If the TIAP portal requests a new catalogue to be uploaded, the runtime will compile the catalogue in a background thread and upload it to the portal when complete (asynchronously, low priority thread). The runtime either then starts the sealed or launched program, or, if the environment DF_EXEC is set, the value of that environment variable's content is used as the launched command line, overriding any -I (launch command) arguments.

On startup, the TIAP runtime can act as a replacement for the system run-time link-editor. The run-time link-editor ("loader") resolves symbols from required libraries and creates the appropriate linkages. The TIAP runtime can redirect any function names specified in the trampoline grammar to itself, resulting in the creation of a trampoline. A trampoline function takes temporary control over program code flow performs the desired telemetry collection, calls the original function, and then queues an event to the event queue (if the grammar specifies that the API return value or function timing information is to be collected—otherwise the event is sent before the original function is called).

Static binaries pose a different challenge in the sense that there are typically no imports listed in the executable header. The runtime must perform a "hunt and patch" operation, in an attempt to find the corresponding system call stubs that match the function listed in the telemetry grammar. This can involve the following extra steps: searching through memory regions marked executable for system call (syscall) instructions, handling polymorphic syscall instructions (syscall opcodes buried within other instructions; false positives), handling just in time compiled (JITed) code, and handling self-modifying code. JITed and self-modifying code can be detected by mprotect(2) calls—code behaving in this way will be attempting to set the +X bit on such regions. Certain well known languages that output code using these approaches can be handled by out-of-band knowledge (such as hand inspection or clues/quirks databases).

After a customer's product has been configured to operate with the TIAP, telemetry events can be collected. These events can be communicated to the TIAP using an event API. Each "instrumented" component of the customer's application may be able to access the event API to communicate events. The communicated events may be processed by an event service running on the TIAP. The event service can be implemented as a gRPC endpoint running on a server responsible for the component. When the TIAP runtime detects an event of interest, a gRPC method invocation is invoked on the event service. The TIAP runtime knows the server (and consequently, event service) it will communicate with as this information is hardcoded into the runtime during initial sealing of that component. Certain common events may occur often (e.g., opening the same file multiple times). In this case, the component may submit a "duplicate event" message which refers to a previous event instead of a completely new event message. This reduces traffic to the server.

The telemetry grammars runtime can define a telemetry level for each component or component instance. The telemetry levels can be set one of many different levels (e.g., four different levels). Telemetry levels govern the quantity of events and data sent from the instance to the event service in the TIAP portal. Several different telemetry levels are now discussed. One telemetry level may be a zero or none level that enables the runtime to perform as a passthrough and sends only component start and exit events. Another level may be a minimal level in which the runtime sends only component start events, component exit events, metadata events, and minimal telemetry events. In this level, the runtime only communicates basic information such as the number of file or network operations/etc. Yet another level may be a standard level in which the runtime sends every type of event defined for the minimal level, plus events containing telemetry about the names of files being opened and lists of 5-tuple network connection information. In this level, file events will contain only a file name plus a count indicating the number of times that file was opened. Similarly, this level conveys the list of 5-tuples and a count of how many times that 5-tuple was seen. The standard level also sends event telemetry for the count of each 3rd party API used (count and type). Yet another level is the full level in which the runtime sends all events, including a separate event for each file and network access containing more information about the access, a separate event for each API access, etc. The full telemetry model may buffer events in the instance's filesystem locally before uploading many events in bulk (to conserve network bandwidth).

The telemetry levels can be configured in a variety of different ways. A default telemetry level can be set when the application or component is sealed. If desired any default telemetry level can be overridden at runtime by a runtime tag. The telemetry level can be set by an administrator using the TIAP portal. The administrator can override either of the above settings using a per-instance/component group/application/dashboard setting for the desired telemetry level. Telemetry levels are communicated back to the component multiplexed with the return status code for any event.

The telemetry events can be configured to adhere to a specific message structure. The message structure may be required to interface with the protocol buffers or Interface Definition Language (IDL) used by the event service. Each event can include two parts: an event envelope and an event body. The event envelope can include a header that contains information about the classification/type of the event, and information about the runtime that generated the event. The event body can include a structure containing the event information. This structure is uniquely formatted for each different type of event.

Consider the following pseudocode example, in which the event service is defined by the following IDL, where XXXEvent and YYYEvent have been substituted for arbitrary events.

```
syntax="proto3";
package TIAP;
service Events {
    rpc SendXXXEvent(XXXEventBody) returns (Status) { }
    rpc SendYYYEvent(YYYEventBody) returns (Status) { }
    . . .
}
message EventEnvelope {
    string component_id=1;
    string event_id=2;
    uint64 timestamp=3;
    uint64 timestamp_us=4;
    bool duplicate=5;
    string build_tag=6;
    string runtime_tag=7;
}
message XXXEventBody {
    EventEnvelope envelope=1;
    // more XXX Event field data
}
message YYYEventBody {
    EventEnvelope envelope=1;
    // more YYY Event field data
}
enum StatusCode {
    Unknown=0;
    EventSubmissionFailure=1;
    ComponentStartFailure=2;
    // more to be added as needed
}
message Status {
    StatusCode status_code=1;
    string status_msg=2;
}
```

The event envelope can include several different fields. Seven fields are shown in the example pseudocode above. One field is the component_id field. This field includes the universally unique identifier (UUID) of the component making the event submission. This ID is created during sealing and remains constant for the lifetime of the component. Note that there can be multiple component instances with the same component ID. Another field is the event_id field. This is the UUID of the event being submitted. This ID is selected randomly at event creation time. Event IDs can be reused by setting a 'duplicate' flag. Another field is the uint64 timestamp field which represents of the number of seconds since the start of a component instance (e.g., standard UNIX time_t format) when the event occurred. Yet another field is the timestamp_us-uint64_t which is a representation of the number of microseconds in the current second since the start of the component instance (e.g., standard UNIX time_t format) when the event occurred. Another field is the duplicate field which is set to true to indicate this event is a duplicate of a previously submitted event, and varies only in timestamp. A build_tag field contains the build (sealing) time tag assigned to the component submitting the event, if any. A runtime_tag field contains the runtime (environment variable sourced) tag assigned to the component instance submitting the event, if any.

If the duplicate field is set to 1, this indicates that the event with the supplied event_id has occurred again. In this scenario, the event service will ignore any other submitted values in the rest of the message, except for the updated/new timestamp values.

Many different types of telemetry events can be collected. Each of these event types can be processed by the event service running on the TIAP. Several event types are now discussed. One event type is a component start event, which is sent when the component starts. This event includes information about the component, runtime, host platform and library versions, and other environmental data. Component start events are sent after the runtime has completed its consistency checks and surveyed the host machine for infrastructure-related information. Below is an example IDL for a component start event:

```
service Events {
rpc SendComponentStartEvent(ComponentStartEventBody) returns
(Status) { }
}
message ComponentStartEventBody {
    enum ArchitectureType {
    Unknown= 0;
    AMD64Architecture = 1;
    I686Architecture = 2;
    ARMArchitecture = 3;
    AARCH64Architecture = 4;
}
enum OS {
    Unknown = 0;
    Linux = 1;
    Windows = 2;
}
enum Platform {
    Unknown = 0;
    Native = 1;
    ESXi = 2;
    AWS = 3;
    GCP = 4;
    Azure = 5;
}
EventEnvelope envelope = 1;
OS os = 2;
ArchitectureType architecture_type = 3;
string hostname = 4;          // FQDN hostname
string version = 5;           // Freeform OS version
string string os_type = 6;    // Freeform OS type (if applicable)
Platform platform = 7;        // Platform code
uint32 num_cpus = 8;          // Number of CPUs detected on the
                              host
uint64 cpu_speed = 9;         // Speed (Hz) of the host (if known)
uint64 memory = 10;           // Amount of memory detected on the
                              host
uint64 start_time =11;        // Runtime startup time (seconds)
uint64 start_time_us =12;     // Runtime startup time (microseconds)
```

The IDL shown above describes two enumerations used in this event type: architecture_type and OS. Architecture type is enumerated by a value indicating the platform of the runtime making the event submission. The OS is enumerated by a value indicating the operating system of the runtime making the event submission. The version and os_type fields are freeform strings. For example, on a Windows host, version might be set to "Windows Server 2019". On a Linux host, version might be set to "5.2" (indicating the kernel version). The os_type on a Linux host might be sourced from the content of lsb_release and might contain "Ubuntu 18.04", for example. The runtime will calculate the amount of time spent during component startup and report this in the start_time and start_time_us fields. This time represents the overhead induced by the platform during launch.

Another type of event is a component exit event. A component exit event is sent when the component exits (terminates). Component exit events are sent if the component calls exit(3) or abort(3), and may also be sent during other abnormal exit conditions (if these conditions are visible to the runtime). Component exit events have no event parameters or data other than the event envelope. See exemplary IDL of component exit event below:

```
service Events {
    rpc SendComponentExitEvent(ComponentExitEventBody) returns
        (Status) { }
}
message ComponentExitEventBody { }
```

Another event type is a file event. A file event is sent when various file operations (e.g., open/close/read/write) occur. These are sent for individual operations, when the runtime is in maximum telemetry collection mode. No events are sent on other file operations. File open operations are used to discern component file I/O intent—based on the O_xxx flags to open(2), events may or may not be sent. Exec operations, while not specifically based on open(2), can be sent for components that call exec(3) using a process event. The file event message is defined as follows:

```
service Events {
    rpc SendFileEvent(FileEventBody) returns (Status) { }
}
message FileEventBody { enum FileOperation {
    Unknown = 0;
    FileOpen = 1;
    FileClose = 2;
    FileRead = 3;
    FileWrite = 4;
    FileDelete = 5;
}
EventEnvelope envelope = 1;
FileOperation file_operation = 2; string path = 3;
}
```

The fields defined above should be self-explanatory.

Yet another event type is a bulk file event. A bulk file event can be sent periodically when the runtime is in minimal telemetry collection mode or higher. It can contains a list of files opened plus the count of each open (e.g., "opened/etc/passwd 10 times"). Multiple files can be contained in a bulk file event.

Network events are yet another event type. Network events can be sent when various network operations (e.g., listen/accept/bind) occur. These are sent for individual operations, when the runtime is in maximum telemetry collection mode. Network events can be sent under the following conditions: inbound connections and outbound connections. An inbound connection event can be sent when the component issues a system call (e.g., the bind(2) system call). Outbound Connections—An outbound connection event can be sent when the component issues a connect system call (e.g., connect(2) system call). The network event body can be defined as follows:

```
service Events {
    rpc SendNetworkEvent(NetworkEventBody) returns (Status) { }
}
message NetworkEventBody {
    enum NetworkOperation {
    Unknown = 0;
    OutboundNetworkEvent = 1;
    InboundNetworkEvent = 1;
}
EventEnvelope envelope = 1;
NetworkOperation file_operation = 2;
uint32 address_family = 3;     // Address Family AF_* (socket.h)
uint32 protocol = 4;           // Protocol (/etc/protocols)
byte [16]local_address = 5;    // Local IP (up to 16 bytes)
byte [16]remote_address = 6;   // Remote IP (up to 16 bytes)
uint16 local_port = 7;         // Local port
uint16 remote_port = 8;        // Remote port
}
```

The runtime will fill a NetworkEventBody message with the fields defined above. Protocol numbers are taken from a socket system call (e.g., socket(2) system call) and defined in various protocols. The TIAP portal or command line interface is responsible for converting the protocol numbers to readable strings. Address family information is also taken from a system call (e.g., system(2) call) and correspond to AF_* values from socket.h. The local_address and remote_address fields contain up to 16 bytes of local and remote address information (to accommodate large address types such as IPv6). If shorter address sizes are used, the unused bytes are undefined. It should be noted that all fields are populated on a best-effort basis. In certain circumstances, it is not possible for the runtime to detect some of the parameters required. In this case, the runtime will not supply any value for that field (and the field will default to protobuf's default value for that field type).

Bulk network events are yet another type of telemetry events. Bulk network events can be sent periodically when the runtime is in minimal telemetry collection mode or higher. These events can contain a list of 5-tuple network connection events (e.g., connect from local 1.2.3.4:50 TCP to 4.5.6.7:80). Multiple 5-tuple network connection events can be contained in a bulk network event.

Network change events are another example of telemetry events. Network change evens can be sent when an IP address on the machine changes. This event is also sent by the runtime during component start to let the management portal know which IP addresses the system is currently using. Network change events are sent by the runtime when an network change has been detected on the host. This is a periodic/best-effort message and these events may not be delivered immediately upon network state change. Network changes can include addition or removal of an interface, addition or removal of an IP address to an existing interface, or an alteration of a network's media type. A network change event summarizes the current state of all interfaces on the host. This simplifies the logic required by the API and analytics service as only the latest network change event needs to be examined in order to determine the current state, with the slight drawback of having to re-send information for unchanged interfaces. The network change event can be defined as:

```
service Events {
    rpc SendNetworkChangeEvent(NetworkChangeEventBody) returns (Status) { }
}
message NetworkAddress {
byte [16]address = 1;              // Interface address
uint32 subnet_mask = 2;            // IPv4 subnet mask or IPv6 prefix
                                   length
}
message NetworkInterface {
    string interface_name = 1;     // User-visible network name (eg
                                   "eth0")
    string hardware = 2;           // Hardware type of interface (if
                                   known)
    uint64 media = 3;              // IFM_* Media type (if
                                   known - if_media.h)
    repeated NetworkAddress addresses = 4;    // Address
                                              information
}
message NetworkChangeEventBody { EventEnvelope envelope = 1;
repeated Networkinterface interfaces = 2;
}
```

Memory events are another example of telemetry events. Memory events can be sent when various memory operations (e.g., mprotect/mmap with unsafe permissions) occur. Memory events can be sent when a component attempts to assign an invalid permission to a region of memory. For example, the event may be sent when attempting to set writable and executable memory simultaneously or attempting to set writable permission on code pages. Memory events are not sent for 'normal' memory operations like malloc(2) or free(2). This is due to the volume of ordinary memory events that occur with great frequency during normal component operation. The memory event body can be described as follows:

```
service Events {
    rpc SendMemoryEvent(MemoryEventBody) returns (Status) { }
}
message MemoryEventBody {
    enum MemoryEventType {
        Unknown = 0;
        InvalidPagePermission = 1;
}
enum MemoryPermission {
    None = 0;
    ReadOnly = 1;
    WriteOnly = 2;
    ReadWrite = 3;
    ExecuteOnly = 4;
    ReadExecute = 5;
    WriteExecute = 6;
    ReadWriteExecute = 7;
}
EventEnvelope envelope = 1;
MemoryEventType type = 2;          // Currently "InvalidPagePermission"
MemoryPermission old_permission = 3;   // Old permission
MemoryPermission new_permission = 4;   //New permission
uint64 start_address = 5;          // Starting address of the permission
uint64 size = 6;                   // Length
uint64 caller = 7;                 // Pointer to function requesting the change
}
```

Depending on the type of memory event, the runtime may or may not be able to compute values for all the fields described above. In this case, the default protobuf values for those data types can be used.

Process events are another example of telemetry type. Process events can be sent when process related operations such as fork/exec or library loads occur. The runtime sends a process event when any of the following occur: the process forks using a fork call (e.g., fork(2)), the process executes using any of the exec*(2) or posix_spawn(2) system calls, or the process loads a new library using a open system call (e.g., dlopen(2)). A process event contains an identifier corresponding to the type of event that occurred, with additional information for execute and library load events. The process event body can be described as follows:

```
service Events {
    rpc SendProcessEvent(ProcessEventBody) returns (Status) { }
}
message ProcessEventBody {
    enum ProcessEventType {
        Unknown = 0;
        ForkEvent = 1;
        ExecEvent = 2;
        LibraryEvent = 3;
    }
    EventEnvelope envelope = 1;
    ProcessEventType event_type = 2;       // Event type
    string info = 3;// Extra info
}
```

The info field contains value data if event_type is ExecEvent or LibraryEvent. It is undefined for ForkEvent style process events. The info field contains the name of the executed process plus command line parameters for ExecEvent events, and the fully qualified pathname for LibraryEvent events.

Metadata events are another example of a telemetry type. Metadata events can be sent at periodic intervals to update the management portal with information about memory and CPU usage. Metadata events are periodic events sent from the runtime that contain metrics that are counted by the runtime but that might not necessarily result in alerts being generated. Generally, metadata events are events that contain data that do not fit into other event categories. These metrics can include current process memory usage, current OS-reported CPU usage, number of signals received by the process, TIPA runtime overhead (CPU/memory), and total number of events sent to the event service. Metadata events can be described as follows:

```
service Events {
    rpc SendMetadataEvent(MetadataEventBody) returns (Status) { }
}
message MetadataEventBody { EventEnvelope envelope = 1;
uint64 memory = 2;              // Current process memory usage
float cpu_usage = 3;            // Current process CPU usage
uint64 signals = 4;             // Total number of signals received
float runtime_cpu = 5;          // Runtime CPU % used
uint64 runtime mem = 6;         // Runtime memory used
}
```

It should be understood that the foregoing IDL definitions are not exhaustive and that other event IDL definitions are possible based on telemetry gathered using embodiments discussed herein.

Third party API usage events are another telemetry type and can be sent when the component makes use of a monitored third party API (e.g., typically CSP-provided APIs, like S3, RDS, etc).

Figure 7:
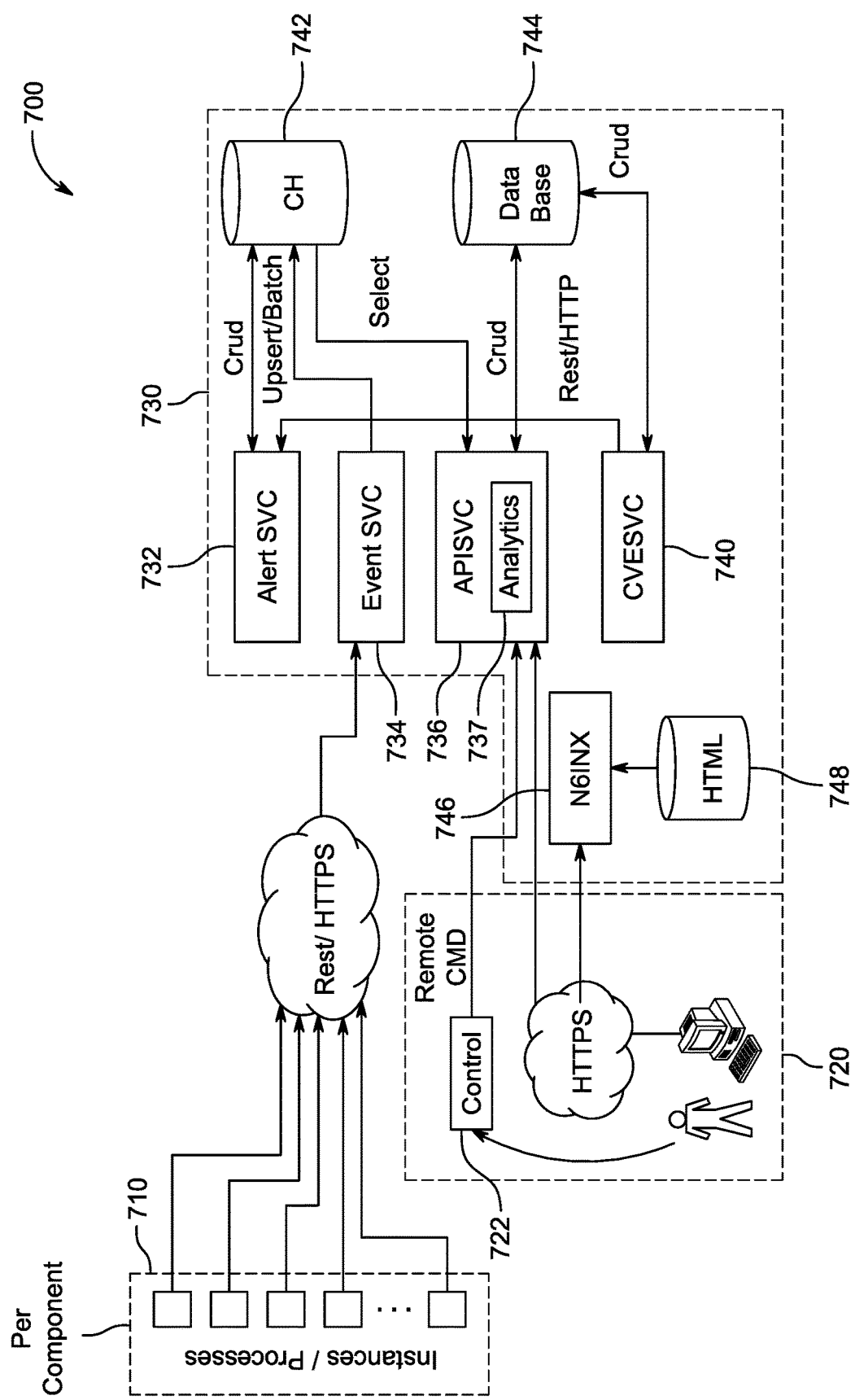
FIG. 7 shows an illustrative block diagram of a portal according to an embodiment.

FIG. 7 shows an illustrative block diagram of TIAP 700 according to an embodiment. In particular, FIG. 7 shows instances of one or more components 710 associated with a customer application being run and sending telemetry events, a user interface 720 for interfacing with the TIAP, and backend portion of the TIAP portal 730. The dashed line box 710 can represent one component associated with an application that has sealed component configured to communicate telemetry events to TIAP portal 730. Each box within dashed line box may represent specific instances or processes for that component. It should be understood that multiple components are typically associated with an application, but only one is shown to avoid overcrowding the drawing. User interface 720 can include, for example, a website based user interface that enables an administrator to access TIAP portal 730. The content of the UI can be delivered by an engine X (nginx) web server (preconfigured in the appliance image if hosted on-premise). The user can interact with a control UI 722 to send remote commands to API service 732 in TIAP portal 730. Example screen shots of different UI screens are discussed in more detail below. TIAP portal 730 can operate several different services, a click house, a postgres (PG), and HTML code. In particular, TIAP portal 730 can include alert service 732, event service 734, API service 736, webapp service 738, CVE service 740, clickhouse 742, databases 744, servicer software 746, and HTML database 748. CRUD represents basic functions of persistent storage, including create, read, update, and delete. REST refers to a representational state transfer that defines a set of constraints.

TIAP 700 can be implemented as a multitenant SaaS service. This service contains all the TIAP platform software components. It is anticipated that some customers may desire to host parts or all of the SaaS portal in their own datacentre. To that end, a single-tenant version of the TIAP portal services can be made available as appliance virtual machine images. For example, the appliance image can be an .OVF file for deployment on a local hypervisor (for example, VMware vSphere, Microsoft Hyper-V, or equivalent), or as an Amazon Web Service Amazon Machine Image (AMI). The appliance images are periodically updated and each deployed appliance can optionally be configured to periodically check for updated appliance code.

API service 736 can implement a core set of APIs used by consumers of TIAP 700. For example, API service may enable user interface 722, a command line application tool, or any customer-written applications that interface with TIAP 700. In some embodiments, API service 736 may function as an API server. API service 736 can be in Node.js using a Sail JS MVC framework. Services provided by API service 736 can be implemented as REST APIs and manage many different types of entities stored in an event database (e.g., clickhouse 742). One such entity can include applications, where service 736 retrieves application information from a primary DB (database 744) based on various parameters (application name, for example). Another entity can be components in which server 736 retrieves component group information from the primary DB (database 744) based on various parameters (component ID, for example). Yet another entity can include instances in which service 736 retrieves instance information from the primary DB (database 744) based on various parameters (component ID and hostname, for example). Another entity can include events in which service 736 retrieves event information from the Events DB (ClickHouse 742) based on various parameters (component or application ID plus event type, for example).

API service 736 can also provide REST APIs to manage alert and insight entities stored in an analytics database (not shown). An alert entity API can retrieve alerts that have been deposited by analytics service 737 into an analytics database (not shown). An insight API can retrieve insights (analysis items) that have been generated by analytics service 737.

API service 736 can also provide REST APIs to manage the entities stored in a CVE database. A CVE API can produce a list of CVEs of components that are vulnerable.

API service 736 can provide provides REST APIs to manage the entities stored in a user database. A users API can provide user accounts, including saved thresholds and filters, and other UI settings. A role API can provide group roles, including role permissions.

REST calls to API service 736 can require an API key. API keys are JWTs (JSON Web Tokens) that grant access to the bearer for a particular amount of time. JWTs generated by the API keys are assigned by the authentication service during logon (for the browser/UI based application) and can also be manually created for use with the CLI (users may do this in 'Account Settings' in the UI). If desired, the generation of the JWTs can be performed elsewhere as is known in the art. In addition to the UI and the CLI tool, customers may develop their own applications that interface with the platform. In these scenarios, a "push" or "callback" model is used with the customer's API client (e.g., the application the customer is developing). API service 736 allows for a customer-supplied REST endpoint URL to be registered, along with a filter describing which events the customer's application has interest in. When events of these types are generated, the API server will make a REST PUT request to the customer's endpoint with the event data matching the filter supplied. To safeguard against misconfiguration or slow endpoints causing a potential DoS, successive failures or slow callbacks will result in the callback being removed from the API server, and a log message will be generated in the system log. The API server will also rate limit registration requests. API clients written in this fashion may deregister at any time using the same URL they registered with using the API server's de-registration API. Any registered API client may also be de-registered in the UI (XXX—Where?) or via the CLI tool.

Event Service 734 collects event telemetry from components 710. As explained above, each component has been instrumented to supply telemetry event information to TIAP 700. Upon receiving an event (or multiple events), event service 734 converts the event body into a record that is placed into the Events DB on the ClickHouse 742. Event service 734 can receive events via the Internet.

Analytics Service 737 can periodically survey the events collected by event service 734 and stored in the Events DB and attempts to gather insights based on the events that have been collected. Analytics service 737 is responsible for producing all alerts in the platform, as well as any suggested/remedial corrective tasks. Analytics service 737 gathers events and performs analysis on a continual basis. Analytics service 737 can apply grammars to the collected events to determine whether an alert should be generated. Analytics service 737 can also apply various machine learning models to determine if a pattern of events is detected, and whether this pattern should be alerted. Any insight or alerts that are generated can be stored as a record in the analytics DB (e.g., Postgres 744). The analytics DB is queried by API service 736 when determining if an alert or insight is to be rendered to clients.

CVE Service 740 identifies which CVEs the components have known vulnerabilities. CVE service 740 can include CVEs that are created and maintained by TIAP 700. CVE service 740 can use a CVE database, which is populated from a CVE pack. CVE service 740 periodically scans the event database and determines if any components are vulnerable to CVE. The CVE packs (database dumps) can be created manually by staff operating TIAP 700. This is a manual effort since CVE information is not released/published in a fashion that can be automatically queried. CVE susceptibility can be displayed in a UI hierarchy (e.g., CVE susceptibility is shown based on whatever view is currently active in the UI).

A housekeeping service (not shown) periodically performs cleanup of old data that is no longer required, including audit log data (after archival has been performed or at customer request), old telemetry events (retention time is per-customer specific), old alerts/insights (retention time is per-customer specific), and user accounts that have expired from any linked directory services.

TIAP 700 can maintain several databases in databases 744. An event database can contain all the telemetry received from all sealed applications/components, for all customers. The data in the events database is deposited by the event service and queried by the analytics, CVE, API, and blueprinting services. An insights/alerts database can contain all alerts and insights discovered by the analytics service, as it periodically analyzes data in the events database. Insights/alerts are deposited into the database along with information identifying which component instance (or application) the alert/insight pertains to. An audit log database contains a record of all platform actions performed by a user, for all users in a customer. These entries are generated by the API service as auditable events (changes, etc.) are made using any API offered by the API service. This also includes login/log out events and user profile related events (password changes, etc). A user database contains information about local users defined for a tenant that are known to the platform. The user database also stores API tokens generated by users that are used by the API service for authentication. A configuration database stores any per-customer configuration information not previously described. This includes any information relating to third party integrations. The configuration database also stores portal-wide configuration used by TIAP systems administrators/operations teams.

Figure 8:
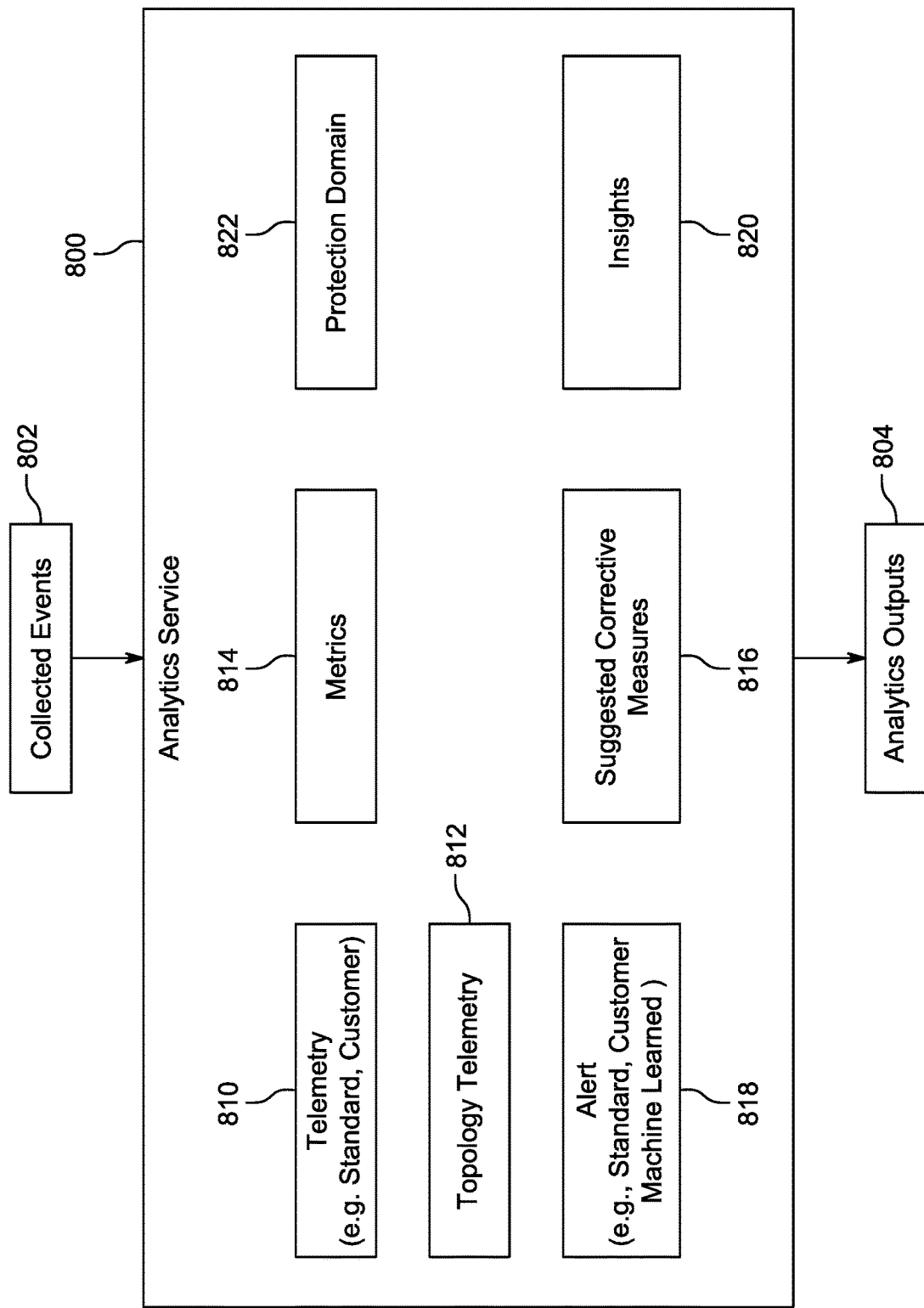
FIG. 8 shows an illustrative block diagram of an analytics service according to an embodiment.

FIG. 8 shows an illustrative block diagram of an analytics service 800 according to an embodiment. Analytics service 800 can analyze collected events 802 and provide outputs 804 based on the analysis performed thereon. Analytics service 800 enables customers to understand the behavior and vulnerabilities of their applications by enabling customers to view in real-time statistics of the execution of their applications and to receive recommended remediation steps to resolve those vulnerabilities and to improve behavior. Analytics service 800 may assist security, operations, and development teams by providing top-down insight into the operation of their applications. The insights may teach the customer how the application is constructed and how it behaves at runtime. Using these insights, customer teams can rapidly deploy updates to their applications to address issues that are identified by the TIAP. In some embodiments, the customer can craft behavioral blueprints (e.g., a policy such as a security policy) that describe the intended behavior of an applications (e.g., how an application should behave, what it should do, and what it should not do). The TIAP runtime can then optionally enforce this sanctioned behavior by applying the blueprint (e.g., security policy) to an application's constituent components.

Analytics service 800 can report insights into application component behavior that deviates from the norm of other similar components. For example, consider an application consisting of 100 identical components (such a configuration is not uncommon in a large microservice-based application). If analytics service 800 determines that an instance suddenly is behaving differently (increased CPU or memory usage, or network traffic) but still is adhering to a security policy or has not triggered an alert, this variance can be reported to the customer in the TIAP portal user interface. Analytics service 800 continually monitors the event telemetry database, and makes periodic decisions as to if an alert or insight is warranted. These decisions are made based on rules defined in the analytics service. Some rules are built into the TIAP portal (such as the standard rules), while others can be customer defined.

Telemetry 810 defines the events that are monitored and collected at the customer's application. Telemetry events have been discussed above and can include standard telemetry grammars and customer generated telemetry grammars. Analytics server 800 may be made aware of which telemetry events are being collected so that it is better able to analyze the collected events. The telemetry events can include, for example, file activity (e.g., what files did the application modify? when? how often did the modifications occur?), network activity (e.g., which hosts did the application accept network requests from? what was the bandwidth of data transferred during those requests? which hosts did the application make outbound connections to?), process activity (e.g., did the application launch any unknown or untrusted processes?), library usage (e.g., what libraries are being used by the application? what is their provenance? are there known security vulnerabilities in the libraries that are being used?), Use of 3rd party APIs—(e.g, is the application accessing 3rd party APIs (such as cloud service provider (CSP) APIs)?, which resources are accessed by the application? are these accesses approved?), and memory activity (e.g., is the application using memory protection in a safe way?). This illustrative list of telemetry events is merely small sample of a much larger set of telemetries that can be collected.

Topology telemetry 812 can capture application composition and topology by monitoring interactions between components of that application. As explained above, an application is composed of several components, and each component is instrumented or sealed so that each instance of each component operation can be monitored and collected. Since components represent the smallest monitorable piece of an application, the TIAP platform's ability to monitor each component enables analytics service 800 the ability to analyze the application as a whole. Moreover, because any given component is typically a single executable or piece of business logic, such as a microservice, or a web server, or a database, the TIAP platform discussed herein is able to assess the application in a very comprehensive manner. Topology telemetry 812 is able to correlate interactions between components on the backend by analyzing the collected events. This is in contrast with a runtime telemetry that was previously programmed into a telemetry grammar to monitor interactions between the components. For example, topology telemetry 812 may be able to track interactions between application components based typically on IP addresses of hosts running those components. Topology telemetry 812 can be used to assess geographical construction of an application (using GeoIP, if possible). This can provide an additional set of data points when determining the behavior of an application (e.g., which geographies is an application's components communicating with, and are those geographies permissible for the application's current configuration?). If GeoIP information is not available, or unreliable for the specific component in question, the TIAP runtime can query the CSP's instance metadata document to determine in which geography the component is running.

Metrics 814 can define certain metrics that are measured during event telemetry. Metrics are a measurement of a specific quantity or value, observed at a given moment in time. Taken as a collection, metrics can be used to create a trend. Trend lines or graphs are visually represented in the user interface of the TIAP portal. Customers can optionally set a threshold for a trend or metric of interest (for example, alert if the trend of file operations per hour exceeds some preset value). For example, a filesystem metric measures the number of file operations (reads, writes, opens, etc.) per second. It also measures the amount of write I/O that is being performed. As another example, the network metric can measure the number of inbound and outbound connections per second, and bandwidth usage. Metrics for any telemetry can be collected. These metrics can be defined in a metric grammar.

Suggested Corrective Measures 816 is responsible for providing suggestions to improve operation of the application. As event telemetry is collected, it is possible that an application may upload an event that represents a deviation from the expected application behavior. Each deviance from the expected application behavior can generate an alert by alerts 818. Suggestive corrective measure 816 can assess the root cause of the alert and provide a recommendation for fixing it. As events are collected over time, the suggested corrective measures 816 can formulate other suggested changes, for situations that might not warrant an alert. For example, observing application behavior can lead the analytics engine to determine that the order of certain operations is vulnerable to TOCTTOU (time of check to time of use) race conditions. Another example of an insight that analytics service 800 can discern is unsafe use of various system calls (such as mmap/madvise) or changes in the number of system calls issued by or signals received by the application over some set time period. Such information can be presented by suggested corrective measures 816 as non-critical suggested corrective measures or suggested optimization opportunities.

Alerts 818 can define conditions or rules that merit an alert when event telemetries satisfy the rules or conditions. The alert conditions can be predefined a standard set of alerts. The alert conditions can be defined by the customer. In addition, the alerts conditions can be derived from machine learning. The alerts can be categorized according to different levels of alert. For example, there may be four levels of alert, each representing a different degree of severity. Each alert may be labeled according to its level and displayed accordingly in the UI portal. Alerts can be defined by alert grammars that instruct analytics service 800 on how an alert can be recognized, and what the corrective measure there is for that alert (if any). For example, an alert grammar might be described as:
IF MEMORY_PERMISSION=WX OR MEMORY_PERMISSION=RWX THEN ALERT WITH "Dangerous memory permission (writable+executable) used" where MEMORY_PERMISSION is a telemetry event measurement collected by the platform runtime. Note that this is an example grammar to illustrate the concept and is not representative of the real syntax. Alert grammars contain triggers based on metrics, themselves defined by metric grammars. Similar to telemetry and metric grammars, alert grammers are customizable and customer-specific, provisioned from a base set of default grammars.

Insights 820 can define conditions that indicate a potential issue that is identified but does not rise to the level an alert. For example, an insight can be identified when a sudden change occurs with respect to a historical baseline. Insights can be defined with insight grammars, including a standard set of insight grammars and a customer set of insight grammars.

Protection Domain 822 can define high level groupings of events, alerts, metrics, and insights. Protection domains include application operations such as file path access, process execution, network activity, library usage, memory usage, and third party APIs. These Protection domains are abstractions of telemetry events defined by grammars. Such protection domains can be included in a standard set of protection domain grammars. If desired, the customer may customize, delete, or create new protection domains of their own.

The user interface is the primary way in which users interact with the TIAP portal (e.g., portal 730). The UI components can be delivered to the client web browser using an nginx server, which is part of the SaaS backend or appliance. The UI components can be rendered using React locally in the client browser, and interactions with the TIAP portal can be done using a REST-based API exposed by the API service. The user interface may embody several design philosophies. For example, standard views may be provided across multiple levels in the application hierarchy. This ensure that the view remains consistent regardless of what level of the application/component/instance hierarchy is being presented. A time range window can be persistent to enable the user the ability to restrict the current data being presented by start and end times. The UI can include filters to enable user to filter the data being shown (using tags applied to components). For example, a user may choose to filter out all "development" components and only show "production" components by creating suitable filters representing the desired view.

The UI may embody a "drill-down" concept. That is, starting at the highest level, a user may continuously refine their view to embody just what they want to see (via filtering, selecting applications/component groups/instances, and selecting timeline views). The UI can remain as consistent as possible during this refinement. The current level in the hierarchy can be shown to the user with a "breadcrumb" list of previous levels at the top of each view. For example: Dashboard→My Appl→Databases→MySQL DB 7. The levels in the breadcrumb are be clickable, allowing users to navigate up the hierarchy as needed. The UI may use several different frameworks, libraries, and components.

Figure 9:
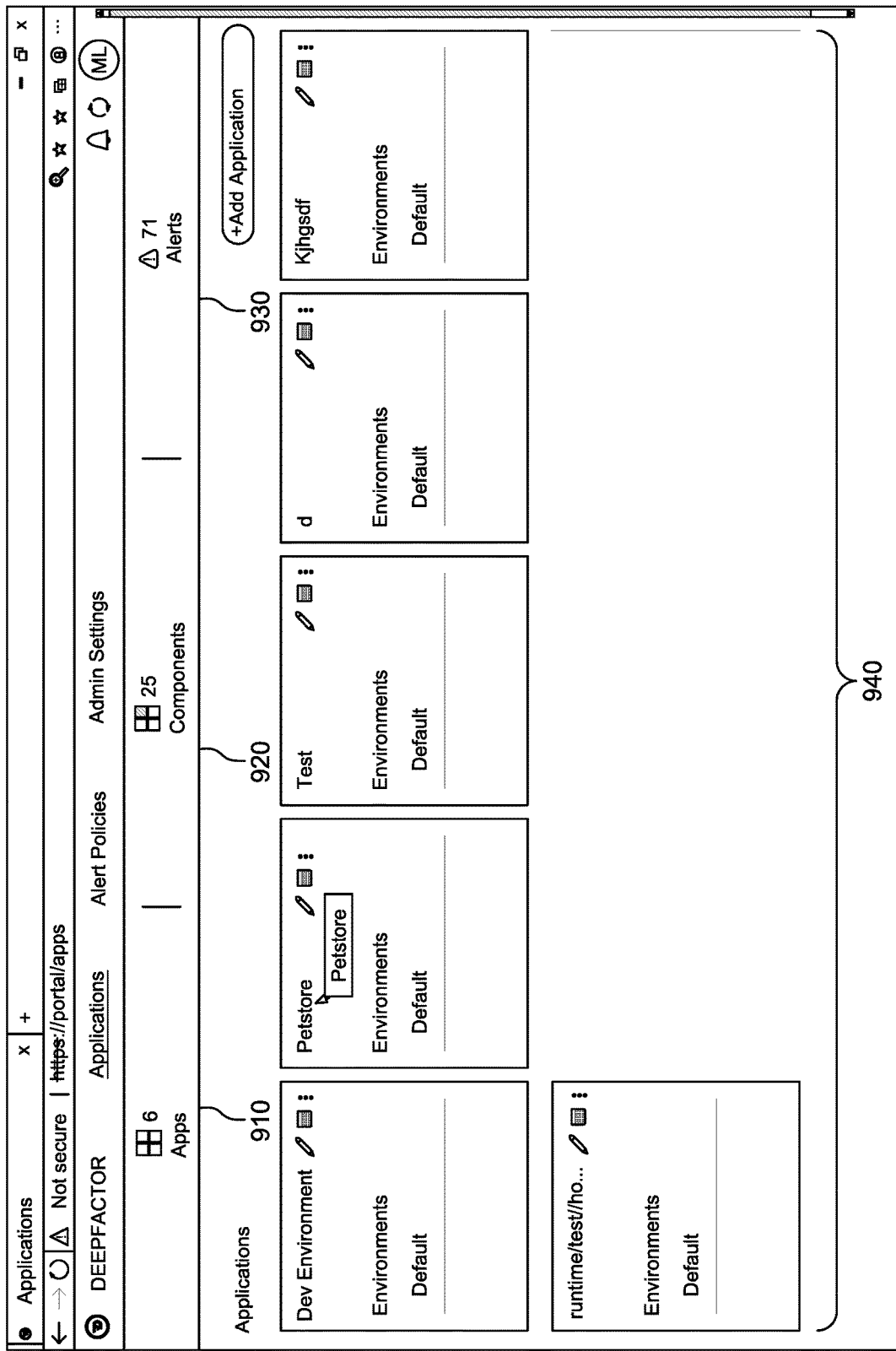

FIG. 9 shows illustrative dashboard 900 view of the UI according to an embodiment. Dashboard view 900 is the highest level in the UI hierarchy and shows the entire universe of applications known by the TIAP for a particular customer. The dashboard view summarizes relevant metrics and trends for all applications 910 and components 920, and summarizes all alerts 930 and recommendations. From dashboard view 900, a user may select any one of application panels 940 for a "drill-down" view into the events applicable only for that particular application (this action transforms the dashboard view into the application view).

Figure 10:
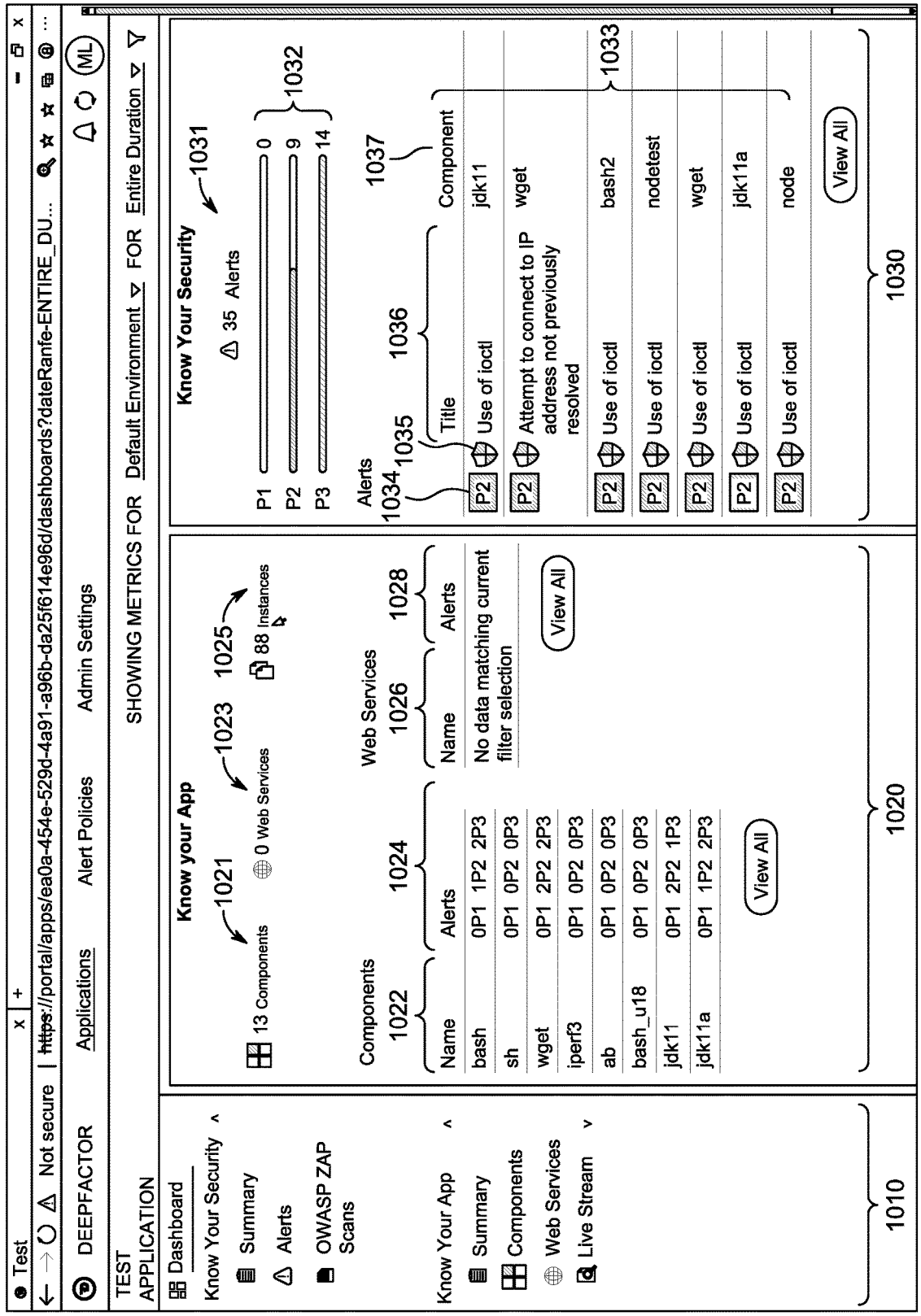
Figure 12B:
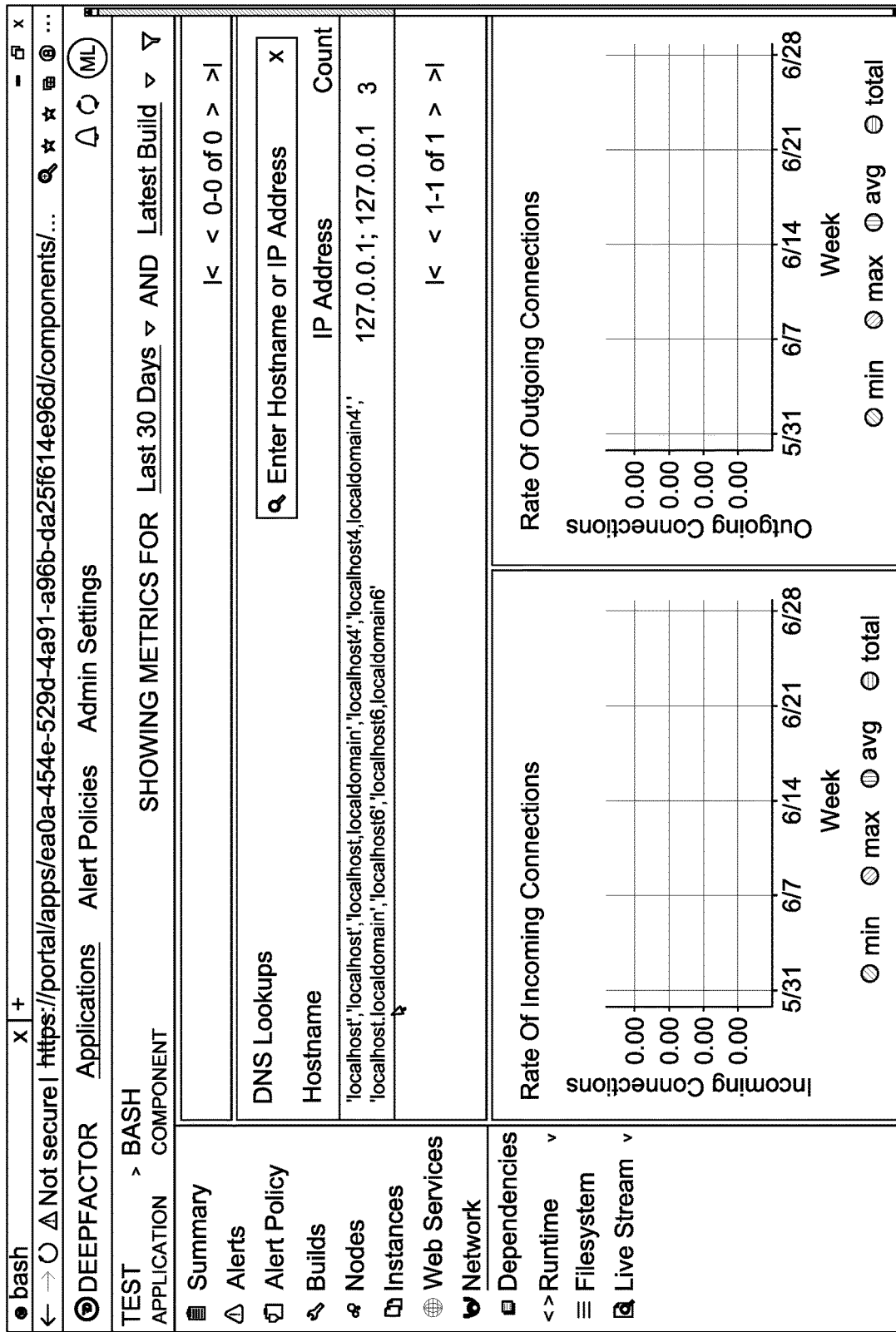
Figure 13A:
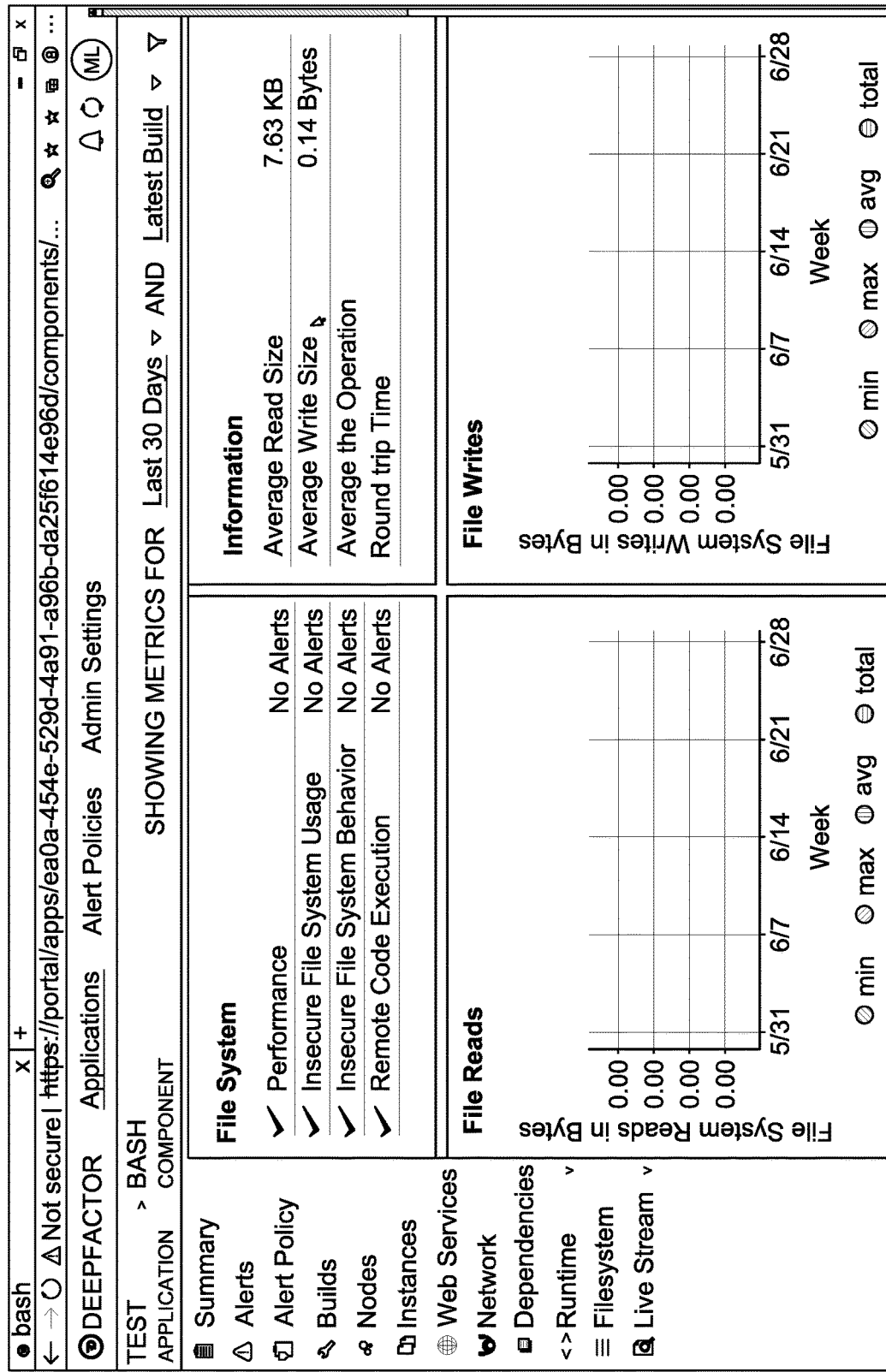

FIG. 10 shows illustrative application view 1000 according to an embodiment. Application view 1000 shows the relevant metrics and trends for a single application, including any alerts and insights known for that application when considering the current time window and filtering rules presently in place. Application view 1000 shows first panel 1010, second panel 1020, and third panel 1030. First panel 1010 can be high level organization tree of the other panels 1020 and 1030. Second panel 1020 can be a "know your app" panel that provides a list of components 1022 running in the application and any alerts 1024 corresponding to those components 1022. Panel 1020 may also show web services 1026 being used by the application and any alerts 1028 corresponding thereto. Panel 1020 can also indicate the number components 1021, number of web services 1023, and number of instances 1025 that are running on the application.

Panel 1030 may specify various security alerts related to the application. Panel 1030 can specify the total number of alerts 1031 and a per priority breakdown of those alerts 1032. A more detailed breakdown of the alerts is shown in sub-panel 1033, which shows alert level 1034, alert type 1035, name of the alert 1036, and component 1037 corresponding to the alert.

Application view 1000 may also show an application world map that shows the composition of an application based on geography (where the components comprising the application are deployed). This can be visually represented in the browser by a map of the world with icons and counts indicating where components are deployed.

From application view 1000, a user may select a component group (a group of one or more components) for a further "drill-down" view into the events applicable only for that component group (this action transforms the application view into the component view).

FIG. 11 shows illustrative component group view 1100 according to an embodiment. Component group view 1100 shows the relevant metrics and trends for a component group. A component group is a collection of the same sealed component (possibly including multiple instances of the same component deployed across one or multiple hosts). View 1100 includes several panels. Panel 1110 is tree of selectable panels to be displayed. Panel 1120 shows network connection metrics (e.g., outgoing connections, incoming connections, rate of incoming connections, and rate of outgoing connections). Panel 1130 shows file system metrics (e.g., filed opened, average read size, and average write size). Panel 1140 shows memory metrics (e.g., average memory consumption and peak memory consumption). Panel 1150 shows web service metrics. Panel 1160 shows specific instances running the component. Panel 1170 shows a summary of instances running, nodes being used and a number of active builds. Panel 1180 shows a total number of alerts along with the number of alerts at each alert level. Panel 1185 shows additional details related to alerts. From component view 1100, a user may select an individual instance in panel 1160 for a further "drill-down" view into the events applicable only for that single instance (this action transforms the component group view into the instance view).

The UI instance view (not shown) shows the relevant metrics and trends for a single component instance. This may be the terminal view for the "drill-down" dashboard/application/component group/instance hierarchy.

The user can select any of the panel names in panel 1110 to view more details related to that selected panel. For example, if the user selects network in penal 1110, the UI may display screen 1200 of FIG. 12A and screen 1250 of FIG. 12B. The content of screens 1200 and 1250 are self-explanatory. As another example, if the user selects File System panel in panel 1110, the UI may display screens 1300 and 1350 of FIG. 13A and FIG. 13B, respectively. The content of screens 1300 and 1350 are self-explanatory. As yet another example, if the user selects Builds in panel 1110, the UI may show screen 1400 of FIG. 14. The content of screen 1400 is self-explanatory. As yet another example, if the user selects Nodes in panel 1110, the UI may show screen 1500 of FIG. 15. The content of screen 1500 is self-explanatory.

Figure 16:
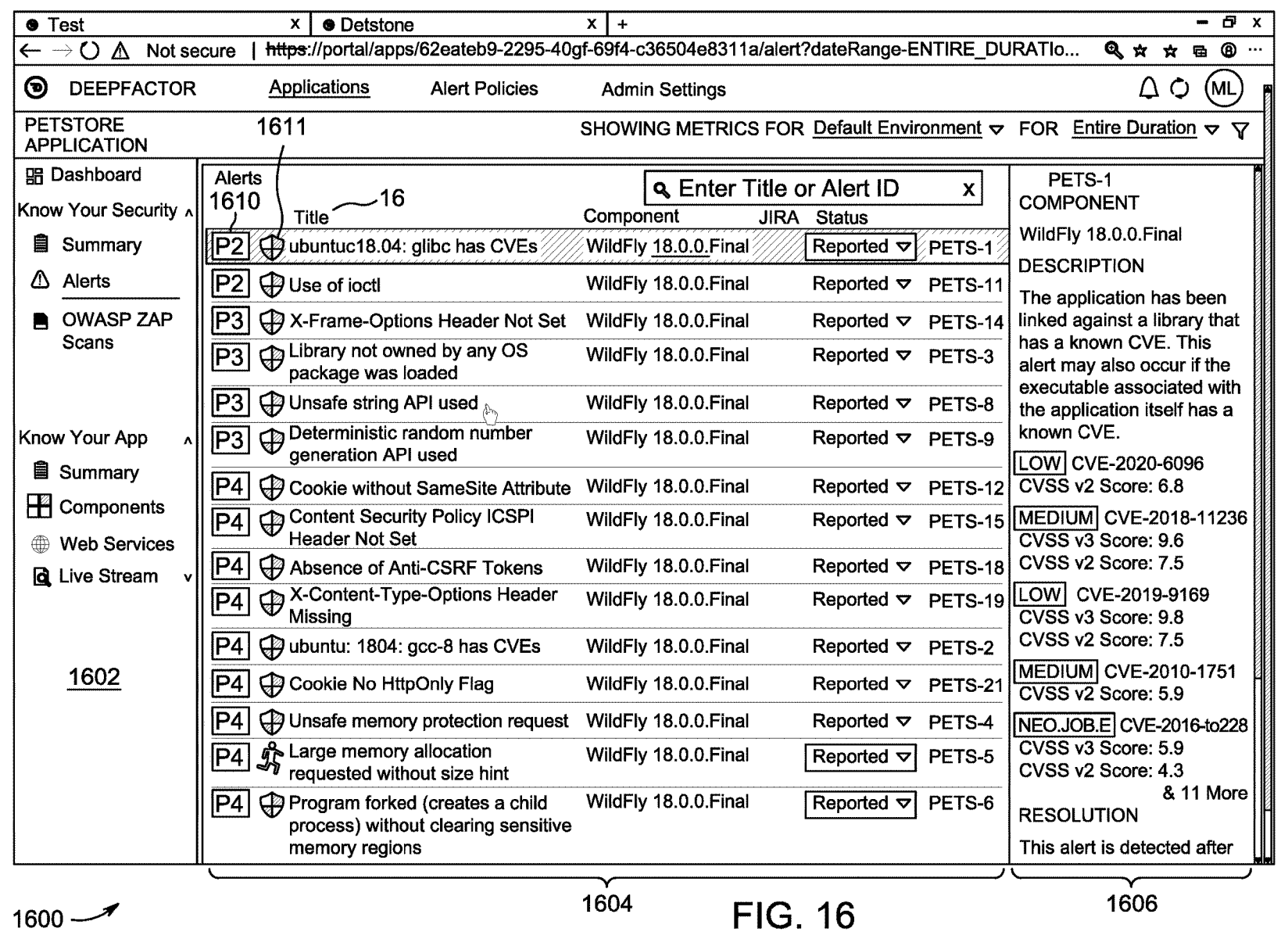

FIG. 16 shows illustrative alert view 1600 according to an embodiment. Alert view 1600 can include all alerts for a particular application or for all application owned by the customer. View 1600 shows subpanel 1602, alert summary panel 1604, and alert specific panel 1606. Alert summary panel 1604 can include alert level 1610, alert type 1611 (e.g., alert or insight), title 1612, component 1614, and status 1616. Alert specific panel 1606 can specify details related to a selected alert in panel 1604, including any CVEs that may be applicable.

If the user selects one of the alerts, screen 1650 of FIG. 16A may be presented. Screen 1650 may provide a detailed view of the alert. The user may select from drop down menu 1660 to select one of the selectable options. The options shown include "reported," which indicates that the alert has been reported, "acknowledged," which indicates that the user has acknowledged the alert, and "not an issue," which indicates the alert is not an issue.

The UI may present a settings/configurations view that allows for per-customer customization settings. These settings can include a lList of current platform components and versions, auto update opt-in/out, user management, and other per-customer settings.

The UI may present an integrations view for defining settings for third-party integrations used by the TIAP. For example, the TIAP can be used in combination with Slack or PagerDuty for receiving alert information when alerts are generated by the analytics service.

The UI may present an account information view for providing per-customer-user account information (e.g., username, password, role configuration, etc.). The account information view can also be used to generate API tokens (JWTs that can be used by customers to interact with the TIAP the CLI tool or applications they have built themselves).

The UI may provide a download icon that enable the user to download a 'keyed' command line tool (containing the sealer program used to create protected/monitored components) to the user via the browser. The 'keying' mechanism means that each sealer only communicates to the appliance that created it (thus removing the need to specify an additional "where is my appliance" command line parameter when using the tool). This 'keying' is accomplished by linking several .o files present in the appliance along with a generated .c/.o file containing the URL and certificate info for the appliance the assembly is being performed on. Creation of the command line tool takes place on an as-needed basis (generally during initial appliance provisioning, after updating the appliance software's version, or after a hostname change). The downloaded command line tool can be used by developers and operations teams during development and test phases, or it can be placed into the CI/CD build pipeline, performing the sealing step as the last step in the build process.

Figure 17:
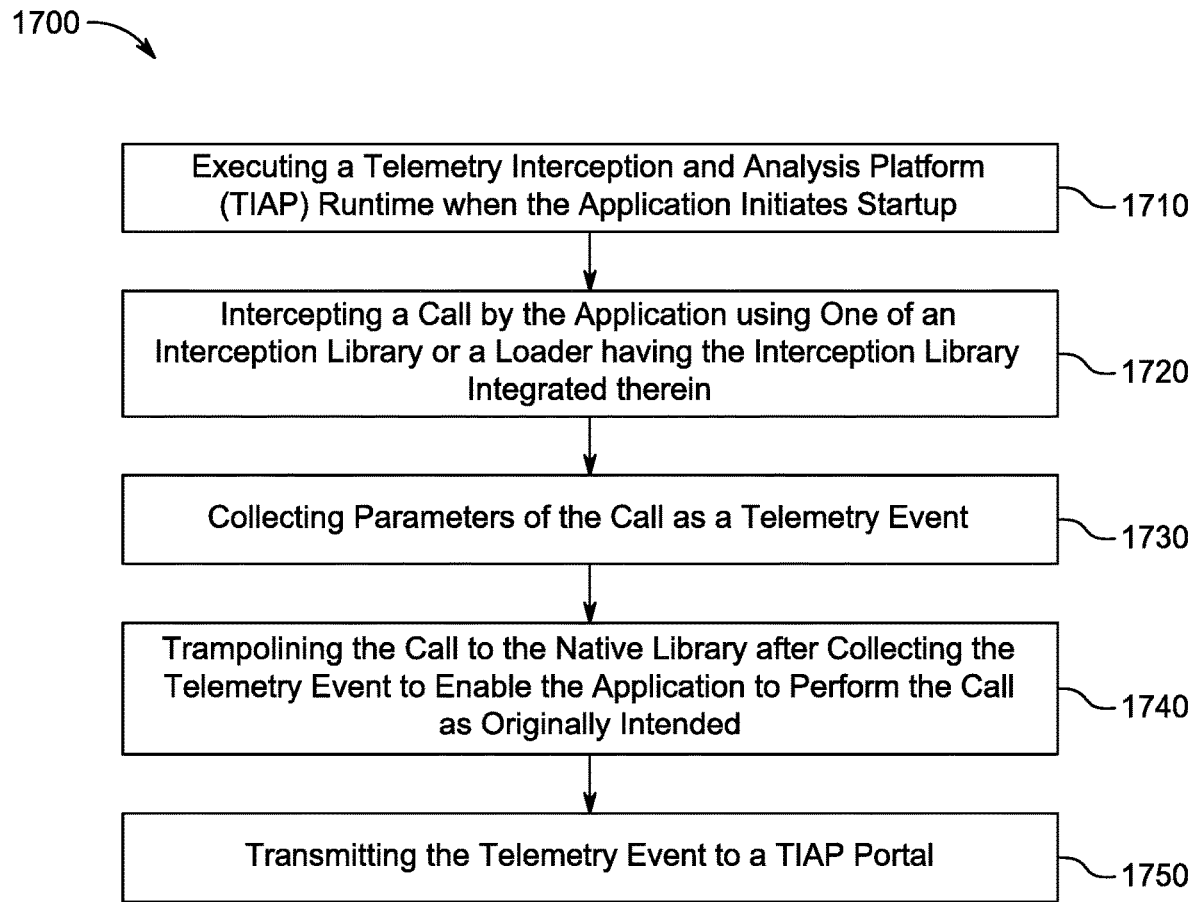
FIG. 17 shows an illustrative process for intercepting events being executed by an application according to an embodiment.

FIG. 17 shows an illustrative process 1700 for intercepting events being executed by an application according to an embodiment. The application can be associated with a native library including code for one or more components that are called by the application during runtime. Starting at step 1710, a TIAP runtime is executed when the application initiates startup. That is, when the application launches, the loader or launcher associated with the TIAP runtime configures the application to access the interception library in lieu of calls to the native library. At step 1720, a call by the application is intercepted using one of an interception library or a loader having the interception library integrated therein. The interception library may be activated using the PRE_LOADER. The loader having the interception library integrated therein may be akin to integrated loader 500 of FIG. 5. Parameters of the call can be collected as a telemetry event at step 1730. The quantity of parameters collected for the telemetry event is controlled by a selected one of a plurality of telemetry levels. For example, the telemetry levels be none, minimal, standard, or full as discussed above. In addition, the telemetry event can be packaged according to a specific message structure an event envelope and an event body, as discussed above. The event envelope can include a component ID, an event ID, a timestamp, a duplicate flag, a build tag, and a runtime tag. The event body can include a structure uniquely formatted for each one a plurality of different event types. The different event types can include, for example, a component start event, a component end event, a file event, a network event, a network change event, a memory event, a process event, a metadata event, and a third party API usage event.

At step 1740, the call is trampolined to the native library after collecting the telemetry event to enable the application to perform the call as originally intended. The interception library can include at least one sealed component corresponding to a respective counterpart component included in the native library, wherein each sealed component is operative to collect the parameters of a call and initiate trampolining of that call to the respective counterpart component in the native library. At step 1750, the telemetry event is transmitted to a TIAP portal. In some embodiments, several collected telemetry events can be batch transmitted to the TIAP portal.

It should be understood that the steps shown in FIG. 17 are merely illustrative that additional steps may be added, that the order of the steps may be rearranged, and that some steps may be omitted.

Figure 18:
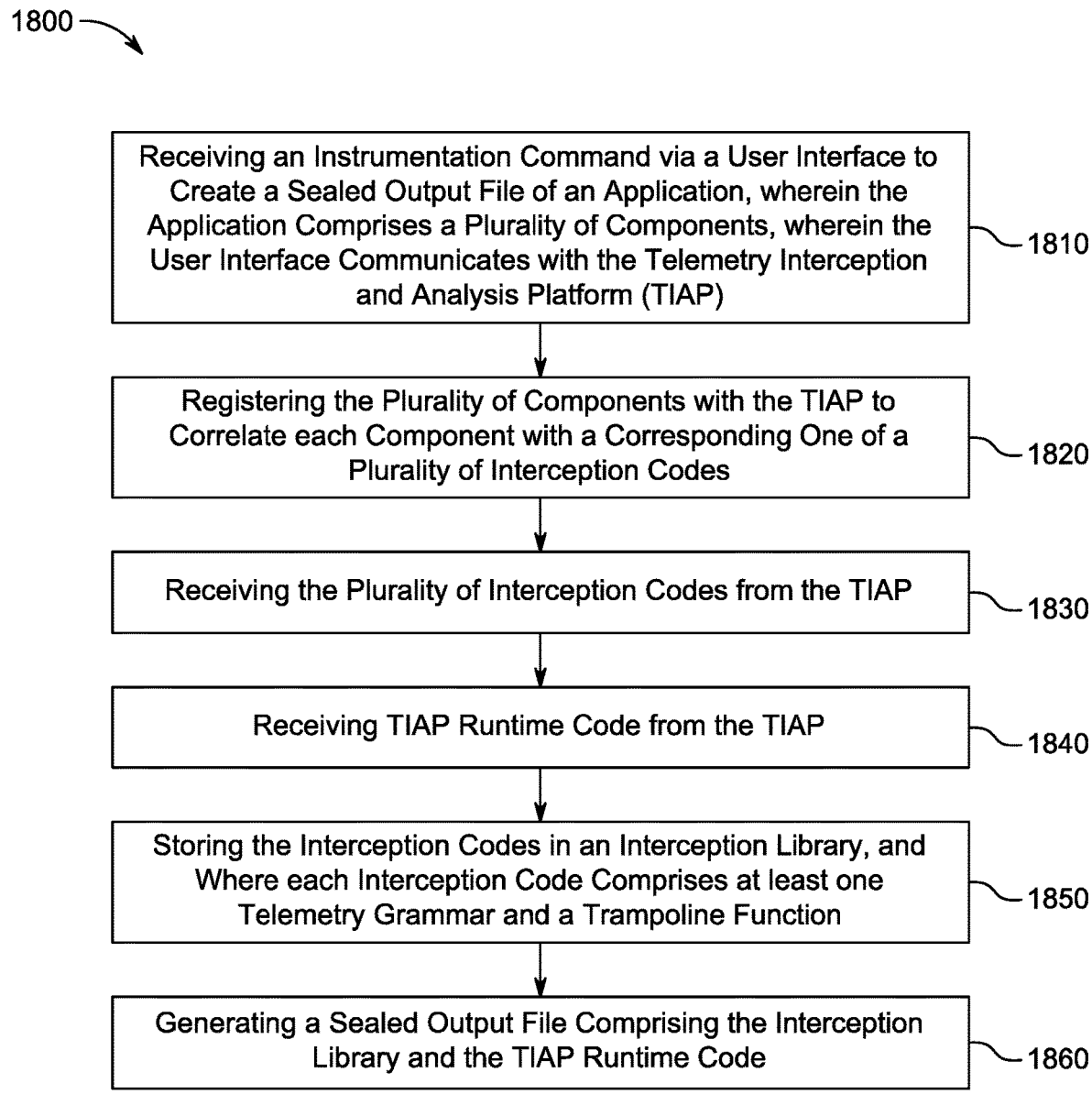
FIG. 18 shows illustrative process for configuring an application to operate in conjunction with a telemetry interception and analysis platform according to an embodiment.

FIG. 18 shows illustrative process 1800 for configuring an application to operate in conjunction with a telemetry interception and analysis platform. Starting with step 1810, an instrumentation command can be received via a user interface to create a sealed output file of an application, wherein the application includes a plurality of components, wherein the user interface communicates with the TIAP. For example, a user may use a command line interface to instrument his or her application. At step 1820, the plurality of components can be registered with the TIAP to correlate each component with a corresponding one of a plurality of interception codes. The plurality of interception codes can be received from the TIAP at step 1830. A TIAP runtime code can be received from the TIAP at step 1840. The interception codes can be stored in an interception library, step 1850. Each interception code comprises at least one telemetry grammar and a trampoline function. The telemetry grammar can define an API or function call to intercept and record as a telemetry event. The telemetry grammar can be selected from a library of telemetry grammars hosted by the TIAP or can be generated by a customer interacting with the user interface. The trampoline function redirects a call from the interception library to a native library associated with the application such that the call is implemented as originally intended. At step 1860, a sealed output file including the interception library and the TIAP runtime code can be generated. In some embodiments, the sealed output file also includes application executable code, and the TIAP runtime code includes a loader that instructs the application to direct all calls to the interception library. In other embodiments, the TIAP runtime code includes a launcher that instructs the application to direct all calls to the interception library, and wherein the sealed output file does not include the application execution code.

It should be understood that the steps shown in FIG. 18 are merely illustrative that additional steps may be added, that the order of the steps may be rearranged, and that some steps may be omitted.

Figure 19:
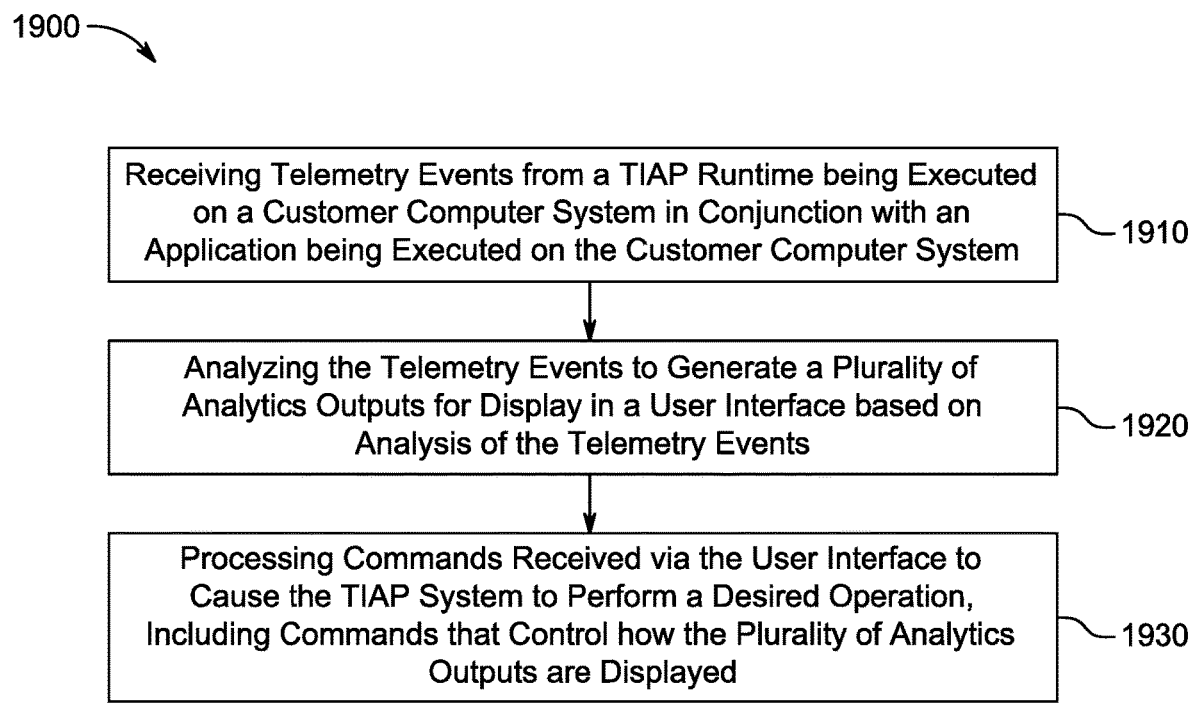
FIG. 19 shows illustrative process for operating a system according to an embodiment.

FIG. 19 shows illustrative process 1900 for operating a TIAP system according to an embodiment. Staring at step 1910, telemetry events can be received from a TIAP runtime being executed on a customer computer system in conjunction with an application being executed on the customer computer system. For example, in FIG. 7, the event servicer can receive telemetry events from components of an application. The telemetry events are intercepted at a library level within a software stack running on the customer computer system, and wherein each telemetry event is associated with a particular instance of a particular component being called by the application. The TIAP system may also register each component associated with the application and provide interception code corresponding to each component to the customer computers system. The interception code can include at least one telemetry grammar and a trampoline function. The telemetry grammar can be selected from a default set of telemetry grammars or a customer generated telemetry grammar.

At step 1920, the telemetry events can be analyzed to generate a plurality of analytics outputs for display in a user interface based on analysis of the telemetry events. As discussed above in connection with FIG. 8, for example, many different evaluations may be performed to generate alerts, metrics, insights, or suggested corrections. The TIAP system may access a plurality of alert criteria that define conditions for triggering an alert based on telemetry events. The alert criteria can include a default set of criteria, a customer generated set of criteria, or a machine learned set of criteria.

At step 1930, commands received via the user interface are processed to cause the TIAP system to perform a desire operation, including commands that control how the plurality of analytics outputs are displayed. The UI is configured to display information in a hierarchical format ranging from a top-level view to a bottom-level view, with at least one middle-level view presented therebetween. The top-level view includes a dashboard (e.g., FIG. 9) that displays all applications associated with a customer, a total number of components being run by all applications, and a total number of alerts associated with all applications. A first middle-level view can include an application view (e.g., FIG. 10) that displays information for a single application. A second middle-level view can include a component view (e.g., FIG. 11) that displays information for a single component associated with the application. The bottom-level view can include an instance view that displays information for a single instance of a given component of the application.

It should be understood that the steps shown in FIG. 19 are merely illustrative that additional steps may be added, that the order of the steps may be rearranged, and that some steps may be omitted.

One or more application programming interfaces ("APIs") may be used in some embodiments (e.g., with respect to system 100, system 700, or any other suitable module or any other suitable portion of such systems of FIGS. 1-8). An API may be an interface implemented by a program code component or hardware component (hereinafter "API-implementing component") that may allow a different program code component or hardware component (hereinafter "API-calling component") to access and use one or more functions, methods, procedures, data structures, classes, and/or other services provided by the API-implementing component. An API can define one or more parameters that may be passed between the API-calling component and the API-implementing component.

An API may allow a developer of an API-calling component, which may be a third party developer, to leverage specified features provided by an API-implementing component. There may be one API-calling component or there may be more than one such component. An API can be a source code interface that a computer system or program library may provide in order to support requests for services from an application. An operating system ("OS") can have multiple APIs to allow applications running on the OS to call one or more of those APIs, and a service (e.g., a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (e.g., not exposed) and can provide a subset of the first set of functions and can also provide another set of functions, such as testing or debugging functions which are not in the first set of functions. In other embodiments, the API-implementing component may itself call one or more other components via an underlying API and may thus be both an API-calling component and an API-implementing component.

An API may define the language and parameters that API-calling components may use when accessing and using specified features of the API-implementing component. For example, an API-calling component may access the specified features of the API-implementing component through one or more API calls or invocations (e.g., embodied by function or method calls) exposed by the API and may pass data and control information using parameters via the API calls or invocations. The API-implementing component may return a value through the API in response to an API call from an API-calling component. While the API may defines the syntax and result of an API call (e.g., how to invoke the API call and what the API call does), the API may not reveal how the API call accomplishes the function specified by the API call. Various API calls may be transferred via the one or more application programming interfaces between the calling component (e.g., API-calling component) and an API-implementing component. Transferring the API calls may include issuing, initiating, invoking, calling, receiving, returning, and/or responding to the function calls or messages. Thus, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list, or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module. It should be understood that the API-implementing component and the API-calling component may be the same or different type of module from each other. API-implementing components may in some cases be embodied at least in part in firmware, microcode, or other hardware logic. In some embodiments, an API may allow a client program to use the services provided by a Software Development Kit ("SDK") library. In other embodiments, an application or other client program may use an API provided by an Application Framework. In such embodiments, the application or client program may incorporate calls to functions or methods provided by the SDK and provided by the API or may use data types or objects defined in the SDK and provided by the API. An Application Framework may, in these embodiments, provide a main event loop for a program that responds to various events defined by the Framework. The API may allow the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, and the like, and the API may be implemented in part by firmware, microcode, or other low level logic that may execute in part on the hardware component.

The API-calling component may be a local component (i.e., on the same data processing system as the API-implementing component) or a remote component (i.e., on a different data processing system from the API-implementing component) that may communicate with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that may be exposed to a different API-calling component.

The API may allow multiple API-calling components written in different programming languages to communicate with the API-implementing component, such that the API may include features for translating calls and returns between the API-implementing component and the API-calling component. However, the API may be implemented in terms of a specific programming language. An API-calling component can, in some embodiments, may call APIs from different providers, such as a set of APIs from an OS provider and another set of APIs from a plug-in provider and another set of APIs from another provider (e.g., the provider of a software library) or creator of the another set of APIs.

Figure 20:
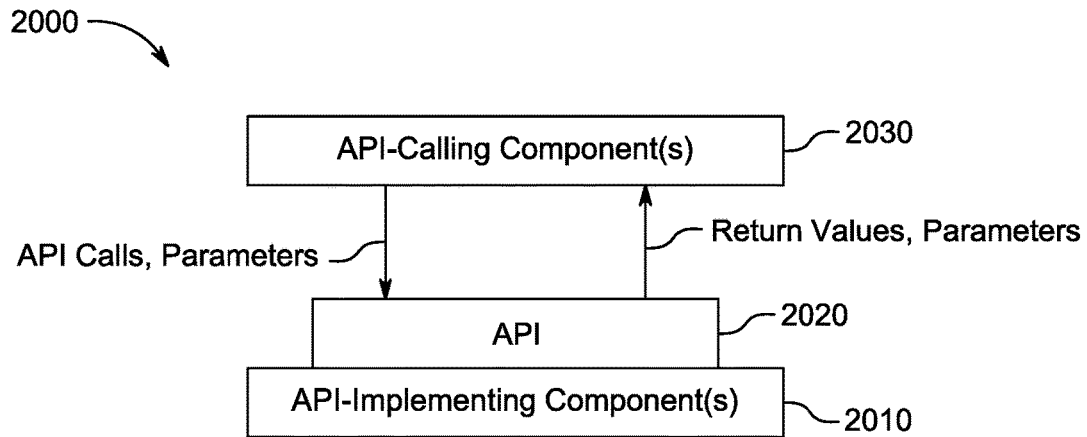
FIG. 20 is a block diagram illustrating an exemplary API architecture, which may be used in some embodiments.

FIG. 20 is a block diagram illustrating an exemplary API architecture 2300, which may be used in some embodiments. As shown in FIG. 23 the API architecture 2300 may include an API-implementing component 2010 (e.g., an operating system, a library, a device driver, an API, an application program, software, or other module) that may implement an API 2020. API 2020 may specify one or more functions, methods, classes, objects, protocols, data structures, formats, and/or other features of API-implementing component 2010 that may be used by an API-calling component 2030. API 2020 can specify at least one calling convention that may specify how a function in API-implementing component 2010 may receive parameters from API-calling component 2030 and how the function may return a result to API-calling component 2030. API-calling component 2030 (e.g., an operating system, a library, a device driver, an API, an application program, software, or other module) may make API calls through API 2020 to access and use the features of API-implementing component 2010 that may be specified by API 2020. API-implementing component 2010 may return a value through API 2020 to API-calling component 2030 in response to an API call.

It is to be appreciated that API-implementing component 2010 may include additional functions, methods, classes, data structures, and/or other features that may not be specified through API 2020 and that may not be available to API-calling component 2030. It is to be understood that API-calling component 2030 may be on the same system as API-implementing component 2010 or may be located remotely and may access API-implementing component 2010 using API 2020 over a network. While FIG. 20 illustrates a single API-calling component 2030 interacting with API 2020, it is to be understood that other API-calling components, which may be written in different languages than, or the same language as, API-calling component 2030, may use API 2020.

API-implementing component 2010, API 2020, and API-calling component 2030 may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices (e.g., CRSM 105, one or more non-volatile data storage devices 107, and main memory 108 of FIG. 1). The computer-readable medium can also be distributed over network-coupled computer systems so that the computer readable code is stored and executed in a distributed fashion. For example, the computer-readable medium may be communicated from one electronic device to another electronic device using any suitable communications protocol (e.g., the computer-readable medium may be communicated to one electronic device from another electronic device via a communications setup and/or to one electronic device from a remote server of a communications setup of the system). The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

Figure 21:
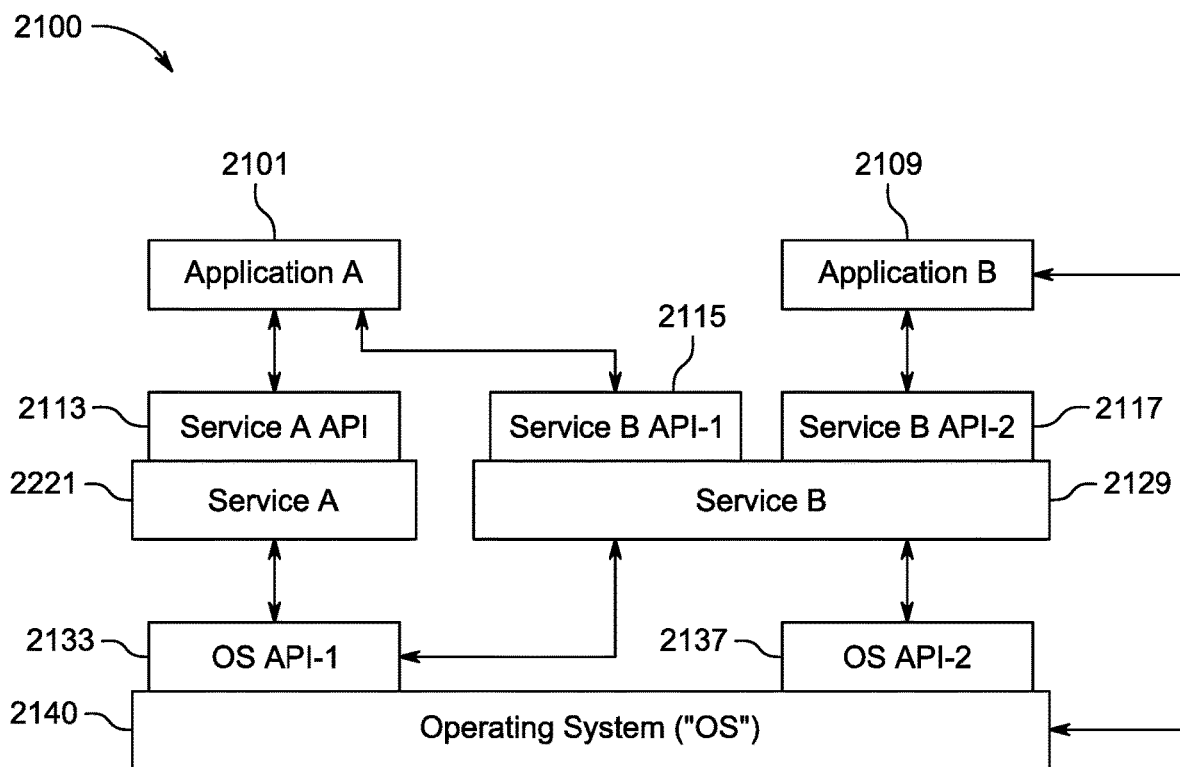
FIG. 21 is a block diagram illustrating an exemplary software stack, which may be used in some embodiments.

FIG. 21 is a block diagram illustrating an exemplary software stack 2100, which may be used in some embodiments. As shown in FIG. 21, Application A 2101 and Application B 2109 can make calls to Service A 2121 or Service B 2129 using several Service APIs (e.g., Service APIs 2113, 2115, and 2117) and to Operating System ("OS") 2140 using several OS APIs (e.g., OS APIs 2133 and 2137). Service A 2121 and Service B 2129 can make calls to OS 2140 using several OS APIs (e.g., OS APIs 2133 and 2137).

For example, as shown in FIG. 21, Service B 2129 may include two APIs, one of which (i.e., Service B API-1 2115) may receive calls from and return values to Application A 2101 and the other of which (i.e., Service B API-2 2117) may receive calls from and return values to Application B 2109. Service A 2121, which can be, for example, a software library, may make calls to and receive returned values from OS API-1 2133, and Service B 2129, which can be, for example, a software library, may make calls to and receive returned values from both OS API-1 2133 and OS API-2 2137. Application B 2109 may make calls to and receive returned values from OS API-2 2137.

In some embodiments, a data processing system may be provided to include a processor to execute instructions, and a memory coupled with the processor to store instructions that, when executed by the processor, may cause the processor to perform operations to generate an API that may allow an API-calling component to perform at least some of the operations of one or more of the processes described with respect to one or more of FIGS. 1-20. In some other embodiments, a data processing system may be provided to include a memory to store program code, and a processor to execute the program code to generate an API that may include one or more modules for performing at least some of the operations of one or more of the processes described with respect to one or more of FIGS. 1-20. In yet some other embodiments, a machine-readable storage medium may be provided that provides instructions that, when executed by a processor, cause the processor to generate an API that allows an API-implementing component to perform at least some of the operations of one or more of the processes described with respect to one or more of FIGS. 1-20. In yet some other embodiments, a data processing system may be provided to include an API-implementing component, and an API to interface the API-implementing component with an API-calling component, wherein the API may include one or more modules or means for performing at least some of the operations of one or more of the processes described with respect to one or more of FIGS. 1-20. In yet some other embodiments, a data processing system may be provided to include a processor to execute instructions, and a memory coupled with the processor to store instructions that, when executed by the processor, cause the processor to perform operations to generate an API-implementing component that implements an API, wherein the API exposes one or more functions to an API-calling component, and wherein the API may include one or more functions to perform at least some of the operations of one or more of the processes described with respect to one or more of FIGS. 1-20. In yet some other embodiments, a data processing system may be provided to include a processor to execute instructions, and a memory coupled with the processor to store instructions that, when executed by the processor, cause the processor to interface a component of the data processing system with an API-calling component and to perform at least some of the operations of one or more of the processes described with respect to one or more of FIGS. 1-20. In yet some other embodiments, an apparatus may be provided to include a machine-readable storage medium that provides instructions that, when executed by a machine, cause the machine to allow an API-calling component to perform at least some of the operations of one or more of the processes described with respect to one or more of FIGS. 1-20.

Moreover, the processes described with respect to one or more of FIGS. 1-20, as well as any other aspects of the disclosure, may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and optical data storage devices. In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol. Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module of any one or more of any system, device, or server may be provided as a software construct, firmware construct, one or more hardware components, or a combination thereof, and may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of any one or more of any system device, or server are merely illustrative, and that the number, configuration, functionality, and interconnection of existing modules may be modified or omitted, additional modules may be added, and the interconnection of certain modules may be altered.

While there have been described systems, methods, and computer-readable media for enabling efficient control of a media application at a media electronic device by a user electronic device, it is to be understood that many changes may be made therein without departing from the spirit and scope of the disclosure. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A telemetry interception and analysis platform (TIAP) system, comprising:
   a server comprising a processor to run a TIAP portal comprising an event service operative to receive telemetry events from a TIAP runtime being executed on a customer computer system in conjunction with an application being executed on the customer computer system,
   wherein the telemetry events are intercepted at a library level within a software stack running on the customer computer system,
   wherein each telemetry event is associated with a particular instance of a particular component being called by the application,
   wherein the TIAP portal further comprises an analytics service operative to analyze the telemetry events to generate a plurality of analytics outputs for display in a user interface based on analysis of the telemetry events, and
   wherein the TIAP portal further comprises an application programming interface (API) service operative to process commands received via the user interface to cause the TIAP system to perform a desired operation, including commands that control how the plurality of analytics outputs are displayed.

2. The TIAP system of claim 1, wherein the analytics service is further operative to analyze how components interact with each other.

3. The TIAP system of claim 1, wherein the API service is further operative to register each component associated with the application and provide an interception code corresponding to each component to the customer computer system.

4. The TIAP system of claim 3, wherein the interception code comprises at least one telemetry grammar and a trampoline function.

5. The TIAP system of claim 4, wherein the at least one telemetry grammar is selected from a default set of telemetry grammars or a customer generated telemetry grammar.

6. The TIAP system of claim 1, wherein the plurality of analytics outputs comprises alerts, metrics, suggested corrective measures, and insights.

7. The TIAP system of claim 1, wherein the analyzing further comprises accessing a plurality of alert criteria that define conditions for triggering an alert based on the telemetry events.

8. The TIAP system of claim 7, wherein the plurality of alert criteria comprise a default set of criteria, a customer generated set of criteria, or a machine learned set of criteria.

9. The TIAP system of claim 1, wherein the TIAP portal is operative to provide the TIAP runtime to the customer computer system.

10. The TIAP system of claim 1, wherein the user interface is configured to display information in a hierarchical format ranging from a top-level view to a bottom-level view, with at least one middle-level view presented therebetween.

11. The TIAP system of claim 10, wherein the top-level view comprises a dashboard that displays all applications associated with a customer, a total number of components being run by all applications, and a total number of alerts associated with all applications.

12. The TIAP system of claim 10, wherein a first middle-level view comprises an application view that displays information for a single application.

13. The TIAP system of claim 10, wherein a second middle-level view comprises a component view that displays information for a single component associated with the application.

14. The TIAP system of claim 10, wherein the bottom-level view comprises an instance view that displays information for a single instance of a given component of the application.

15. A method for operating a telemetry interception and analysis platform (TIAP) system, comprising:
receiving, by a TIAP portal comprising an event service, telemetry events from a TIAP runtime being executed on a customer computer system in conjunction with an application being executed on the customer computer system, wherein the telemetry events are intercepted at a library level within a software stack running on the customer computer system, and wherein each telemetry event is associated with a particular instance of a particular component being called by the application;
analyzing, by the TIAP portal further comprises an analytics service, the telemetry events to generate a plurality of analytics outputs for display in a user interface based on analysis of the telemetry events; and
processing, by the TIAP portal further comprises an application programming interface (API) service, commands received via the user interface to cause the TIAP system to perform a desired operation, including commands that control how the plurality of analytics outputs are displayed.

16. The method of claim 15, further comprising registering each component associated with the application and providing an interception code corresponding to each component to the customer computer system.

17. The method of claim 16, wherein the interception code comprises at least one telemetry grammar and a trampoline function.

18. The method of claim 17, wherein the at least one telemetry grammar is selected from a default set of telemetry grammars or a customer generated telemetry grammar.

19. The method of claim 15, wherein the plurality of analytics outputs comprises alerts, metrics, suggested corrective measures, and insights.

20. The method of claim 15, wherein the analyzing further comprises accessing a plurality of alert criteria that define conditions for triggering an alert based on the telemetry events.

21. The method of claim 20, wherein the plurality of alert criteria comprise a default set of criteria, a customer generated set of criteria, or a machine learned set of criteria.

22. The method of claim 15, wherein the TIAP portal is operative to provide the TIAP runtime to the customer computer system.

23. The method of claim 15, wherein the user interface is configured to display information in a hierarchical format ranging from a top-level view to a bottom-level view, with at least one middle-level view presented therebetween.

24. The method of claim 23, wherein the top-level view comprises a dashboard that displays all applications associated with a customer, a total number of components being run by all applications, and a total number of alerts associated with all applications;
wherein a first middle-level view comprises an application view that displays information for a single application;
wherein a second middle-level view comprises a component view that displays information for a single component associated with the application; and
wherein the bottom-level view comprises an instance view that displays information for a single instance of a given component of the application.

* * * * *